(12) United States Patent
Kim et al.

(10) Patent No.: US 10,719,826 B2
(45) Date of Patent: Jul. 21, 2020

(54) PAYMENT METHOD, PAYMENT APPARATUS, AND PAYMENT SYSTEM USING ELECTRONIC WALLET

(71) Applicant: Samsung Electronics Co., Ltd., Suwon-si, Gyeonggi-do (KR)

(72) Inventors: Ho Kim, Seoul (KR); Jin-Wan Choi, Suwon-si (KR); Soo-Bin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 15/124,178

(22) PCT Filed: Mar. 13, 2015

(86) PCT No.: PCT/KR2015/002429
§ 371 (c)(1),
(2) Date: Sep. 7, 2016

(87) PCT Pub. No.: WO2015/137756
PCT Pub. Date: Sep. 17, 2015

(65) Prior Publication Data
US 2017/0076282 A1     Mar. 16, 2017

(30) Foreign Application Priority Data

Mar. 14, 2014   (KR) .................. 10-2014-0030315

(51) Int. Cl.
*G06Q 40/00* (2012.01)
*G06Q 20/38* (2012.01)
(Continued)

(52) U.S. Cl.
CPC ......... *G06Q 20/387* (2013.01); *G06Q 20/204* (2013.01); *G06Q 20/36* (2013.01); *G06Q 20/405* (2013.01)

(58) Field of Classification Search
CPC ...................................................... G06Q 40/00
(Continued)

(56) References Cited

U.S. PATENT DOCUMENTS 7,818,271 B2 * 10/2010 Groble ................. G06N 7/005
706/12
8,212,688 B2 * 7/2012 Morioka ................. G08G 1/08
340/907

(Continued)

FOREIGN PATENT DOCUMENTS

KR   10-2011-0121209 A   11/2011
KR   10-2012-0093662 A   8/2012
(Continued)

OTHER PUBLICATIONS

European Preliminary Opinion dated Nov. 25, 2019, issued in European Patent Application No. 15760741.7-1217.
(Continued)

*Primary Examiner* — Kirsten S Apple
(74) *Attorney, Agent, or Firm* — Jefferson IP Law, LLP

(57) ABSTRACT

A method, apparatus, and system for paying are provided. The method for paying of an electronic device includes: receiving item order information from a POS terminal; determining a payment method by considering at least one of a discount benefit and a reward point saving benefit based on the received item order information; and requesting a payment approval for the item order information in the determined payment method.

9 Claims, 16 Drawing Sheets

(51) Int. Cl.
*G06Q 20/20* (2012.01)
*G06Q 20/36* (2012.01)
*G06Q 20/40* (2012.01)

(58) Field of Classification Search
USPC .......................................................... 705/35
See application file for complete search history.

(56) References Cited

U.S. PATENT DOCUMENTS

| | | | | |
|---|---|---|---|---|
| 8,452,654 | B1* | 5/2013 | Wooters | G06Q 30/0234 705/14.34 |
| 8,583,549 | B1* | 11/2013 | Mohsenzadeh | G06Q 20/227 705/39 |
| 2002/0194048 | A1* | 12/2002 | Levinson | G06Q 10/06311 705/7.26 |
| 2006/0208065 | A1* | 9/2006 | Mendelovich | G06Q 20/04 235/380 |
| 2006/0247973 | A1* | 11/2006 | Mueller | G06N 3/126 705/14.14 |
| 2007/0022058 | A1 | 1/2007 | Labrou et al. | |
| 2009/0030789 | A1 | 1/2009 | Mashinsky | |
| 2009/0259549 | A1* | 10/2009 | Winand | G06Q 10/08 705/14.35 |
| 2010/0191570 | A1* | 7/2010 | Michaud | G06Q 30/02 705/7.33 |
| 2010/0205091 | A1* | 8/2010 | Graziano | G06Q 20/102 705/40 |
| 2012/0310723 | A1* | 12/2012 | Moradian | G06Q 30/0207 705/14.27 |
| 2013/0097107 | A1* | 4/2013 | Kobayashi | G06N 3/126 706/12 |
| 2013/0297452 | A1 | 11/2013 | Schreiner et al. | |
| 2013/0339165 | A1 | 12/2013 | Calman | |
| 2014/0006149 | A1 | 1/2014 | Grigg et al. | |
| 2014/0040003 | A1 | 2/2014 | Kothari et al. | |
| 2014/0100936 | A1* | 4/2014 | Blackhurst | G06Q 30/02 705/14.27 |
| 2014/0114842 | A1* | 4/2014 | Blackhurst | G06Q 30/06 705/39 |
| 2014/0164082 | A1* | 6/2014 | Sun | G06Q 30/0214 705/14.16 |
| 2014/0164220 | A1* | 6/2014 | Desai | G06Q 20/06 705/39 |
| 2014/0297381 | A1 | 10/2014 | Park | |
| 2015/0006271 | A1* | 1/2015 | Oppenheim | G06Q 30/06 705/14.23 |

FOREIGN PATENT DOCUMENTS

| | | |
|---|---|---|
| KR | 10-1184865 B1 | 9/2012 |
| KR | 10-2013-0083029 A | 7/2013 |
| KR | 10-1339661 B1 | 12/2013 |

OTHER PUBLICATIONS

European Decision to Refuse dated Jan. 3, 2020, issued in European Patent Application No. 15760741.7-1217.
European Result of Consultation dated Jul. 16, 2019, issued in European Patent Application No. 15760741.7-1217.
European Summons to Attend Oral Proceedings dated Jul. 22, 2019, issued in European Patent Application No. 15760741.7-1217.
Korean Office Action dated May 28, 2020, issued in Korean Patent Application No. 10-2014-0030315.

* cited by examiner

[Fig. 1]
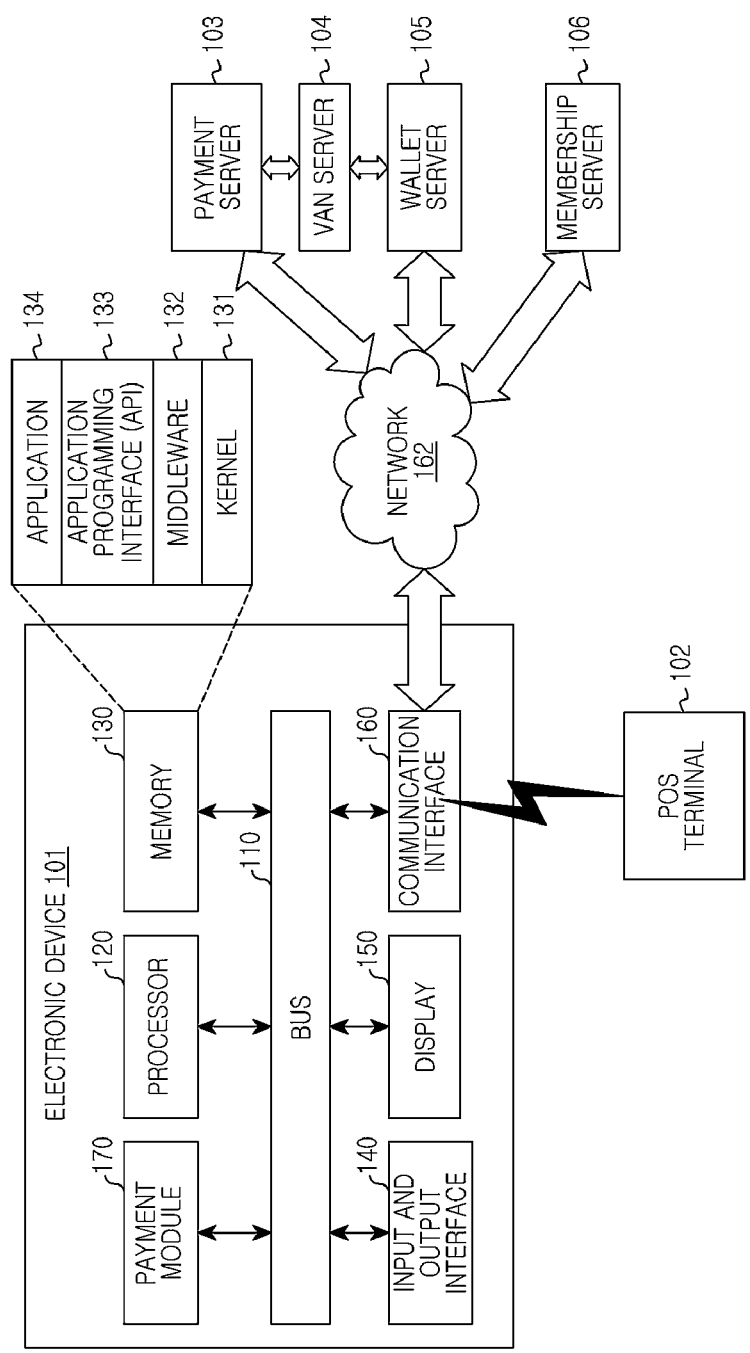

[Fig. 2]
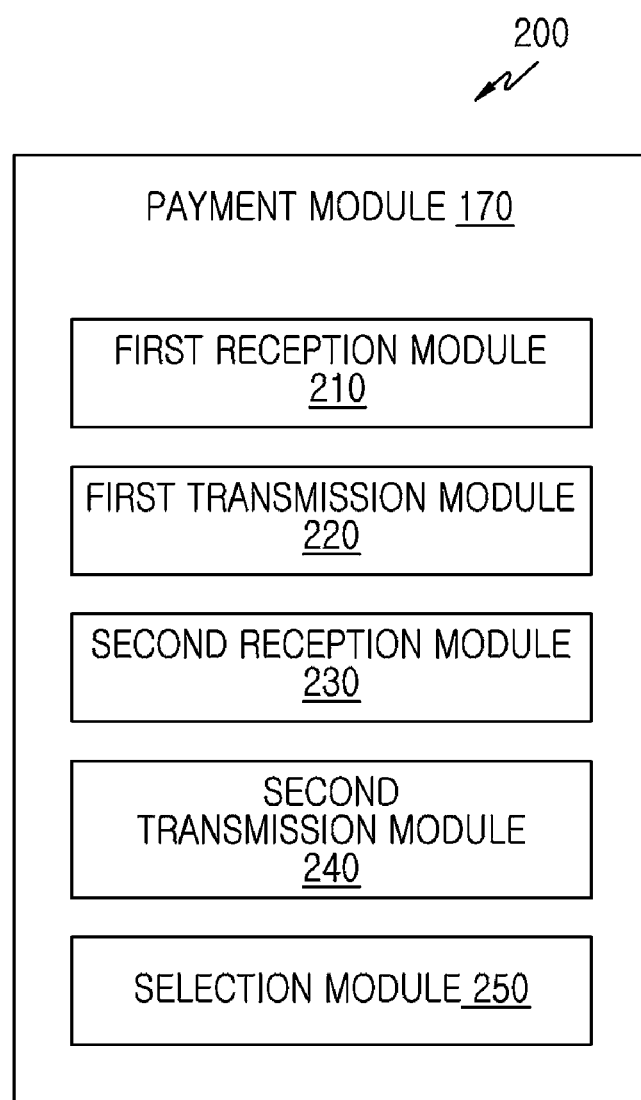

[Fig. 3]
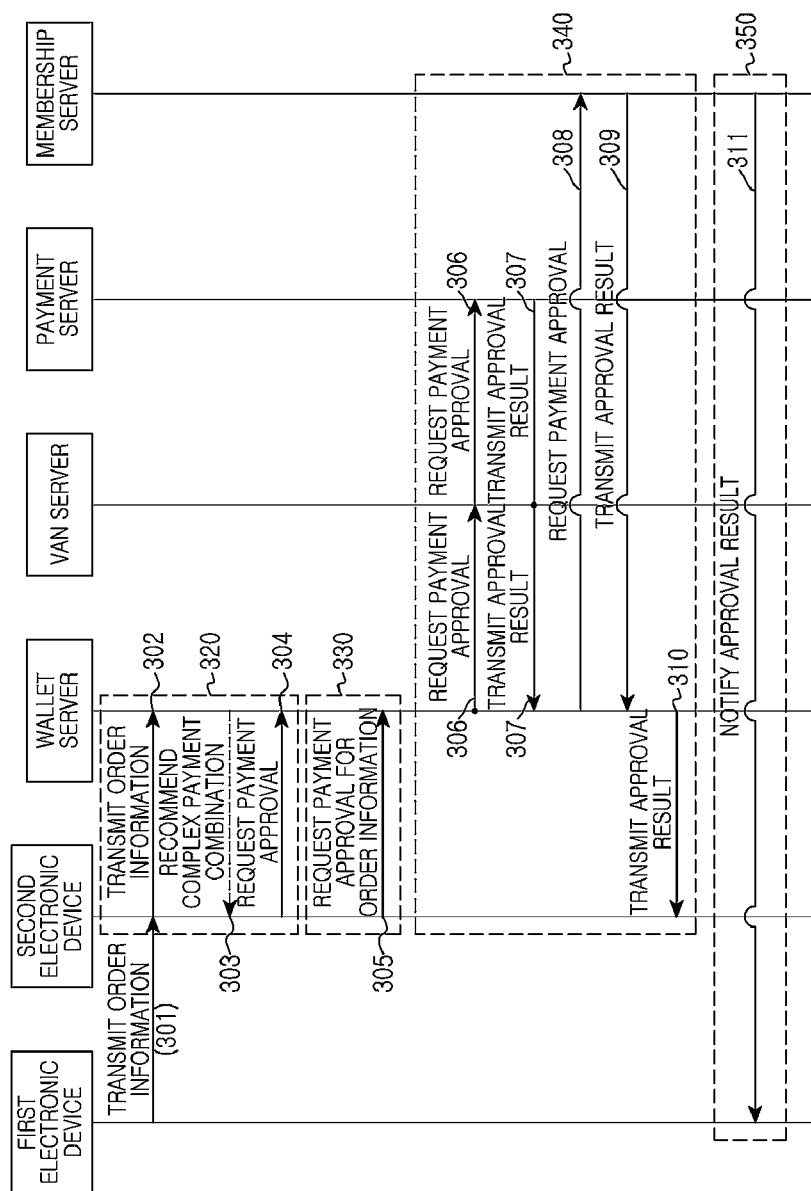

[Fig. 4]
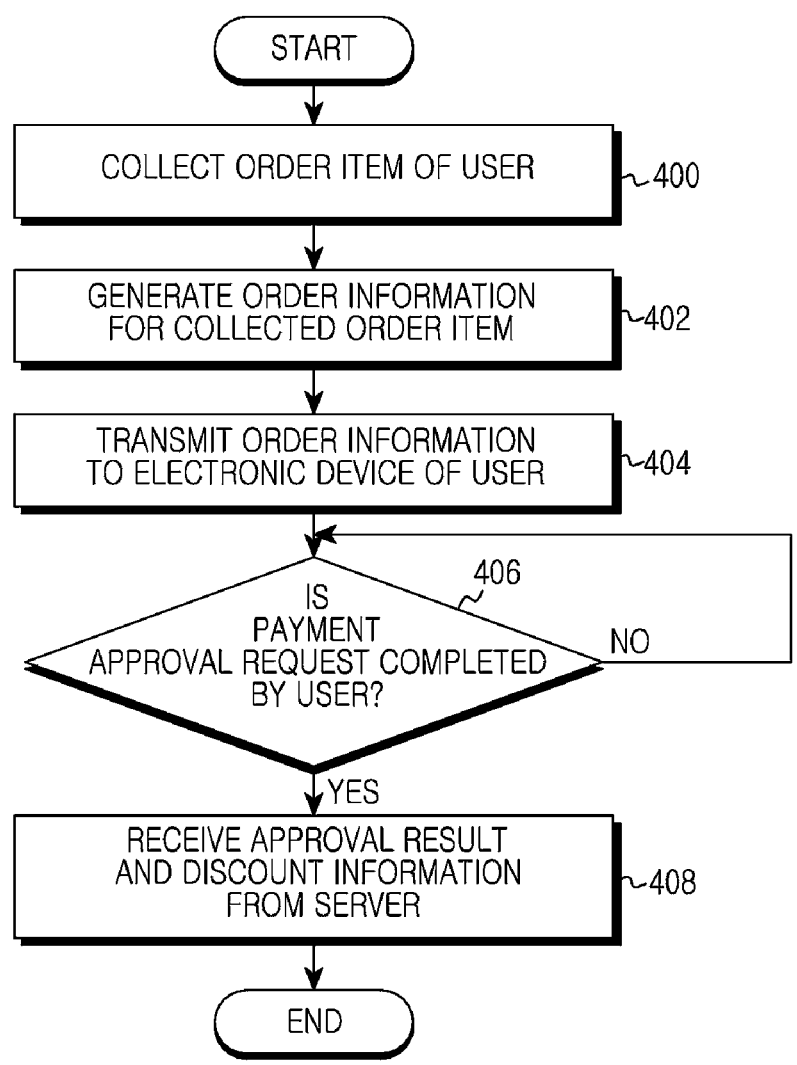

[Fig. 5]
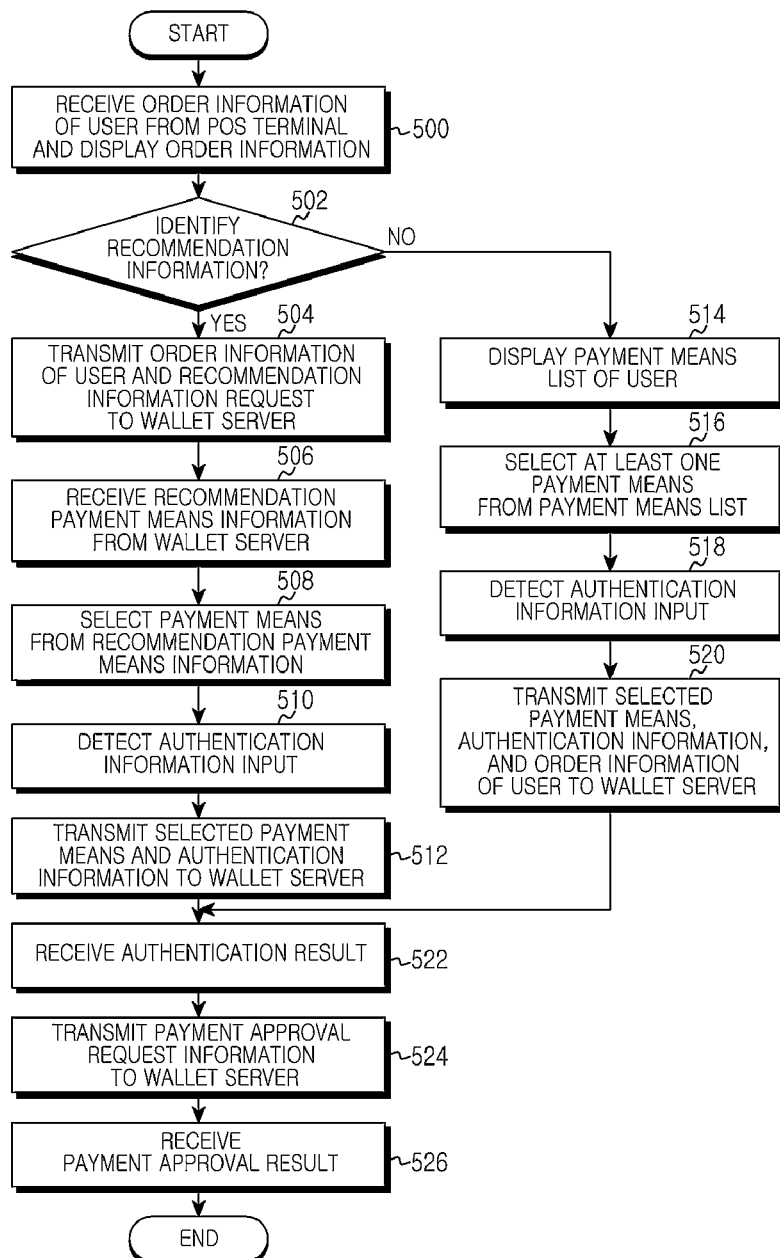

[Fig. 6]
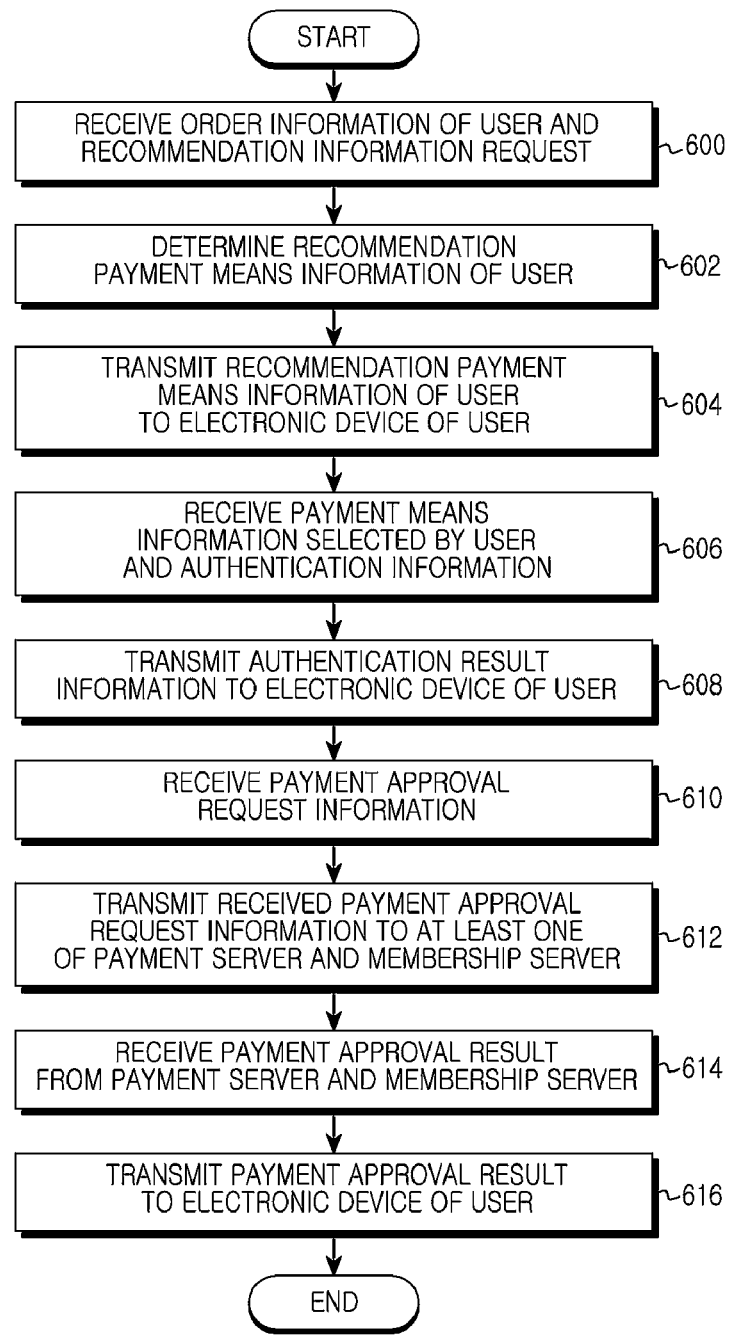

[Fig. 7]
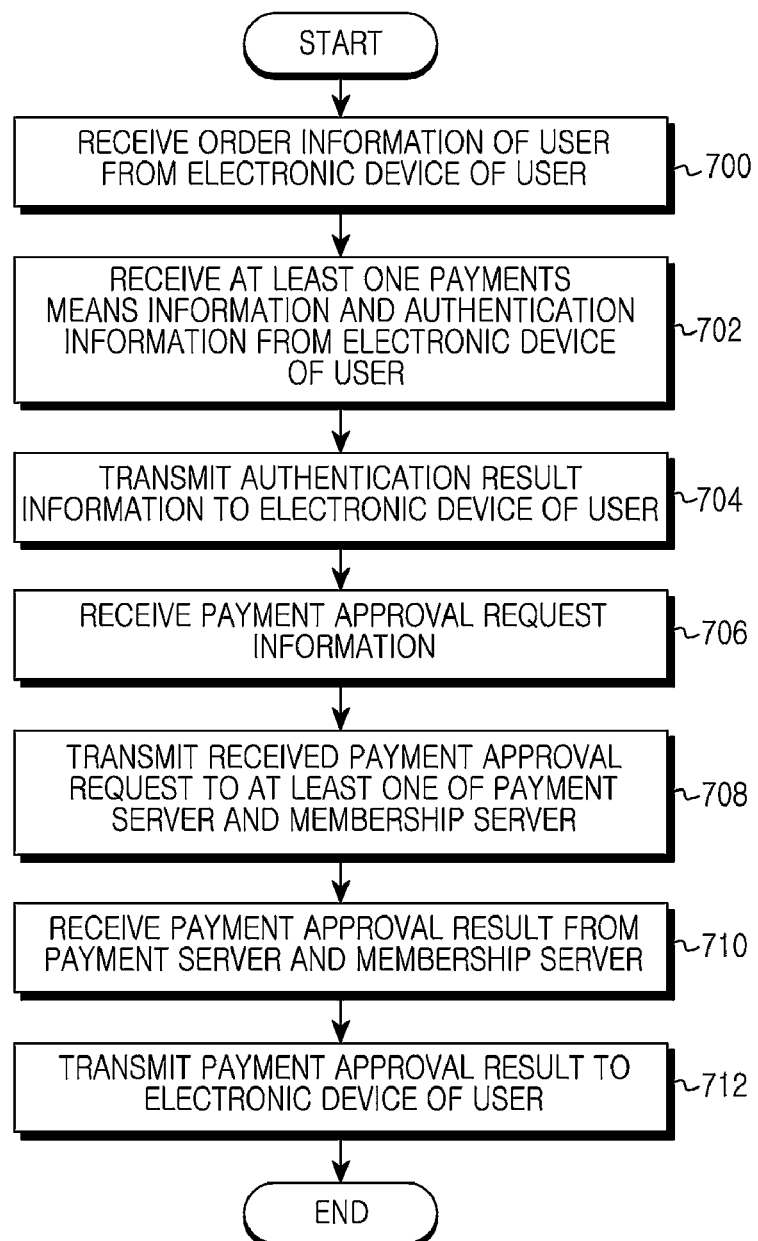

[Fig. 8a]
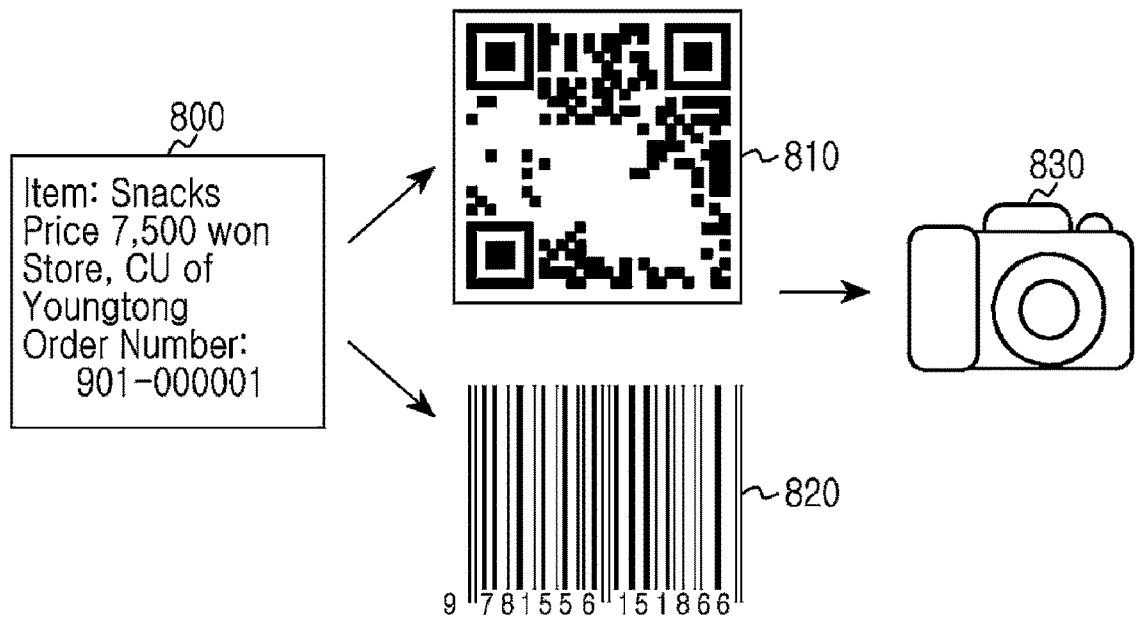
[Fig. 8b]
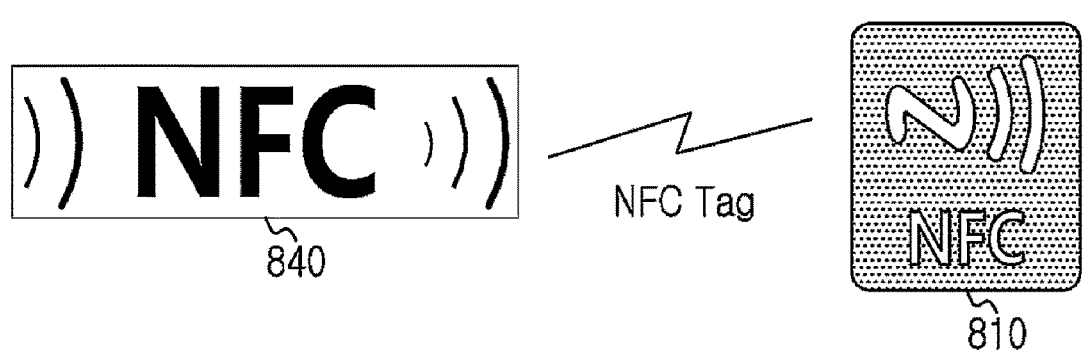

[Fig. 9]
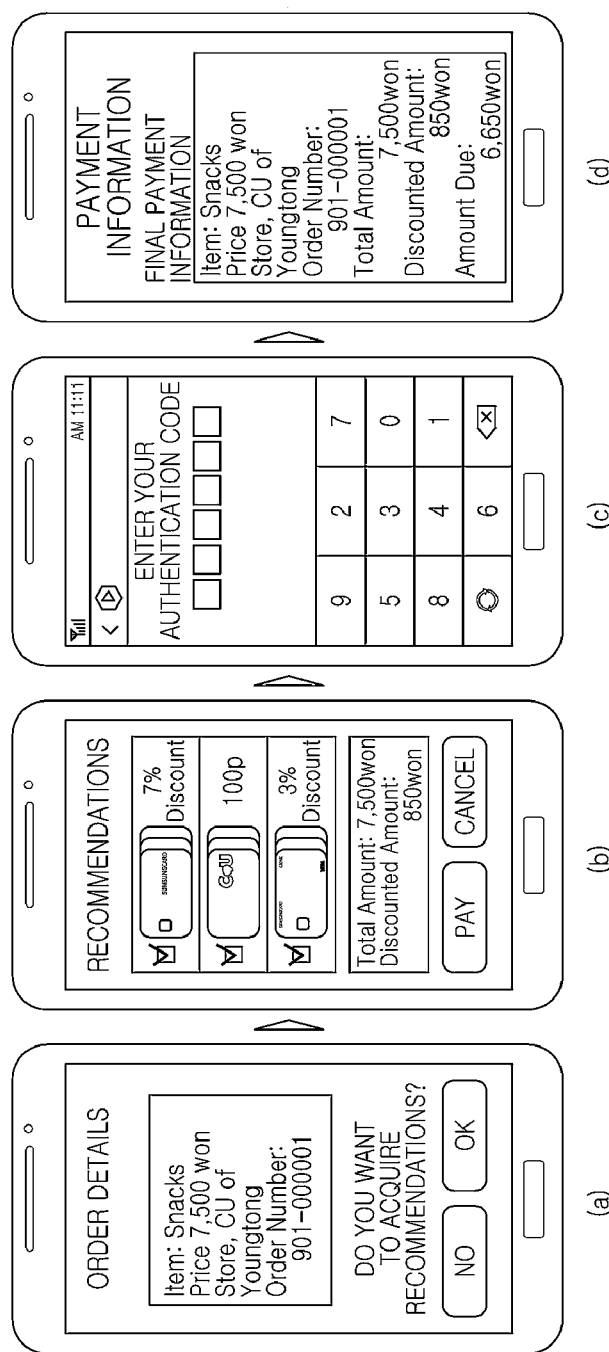

[Fig. 10]
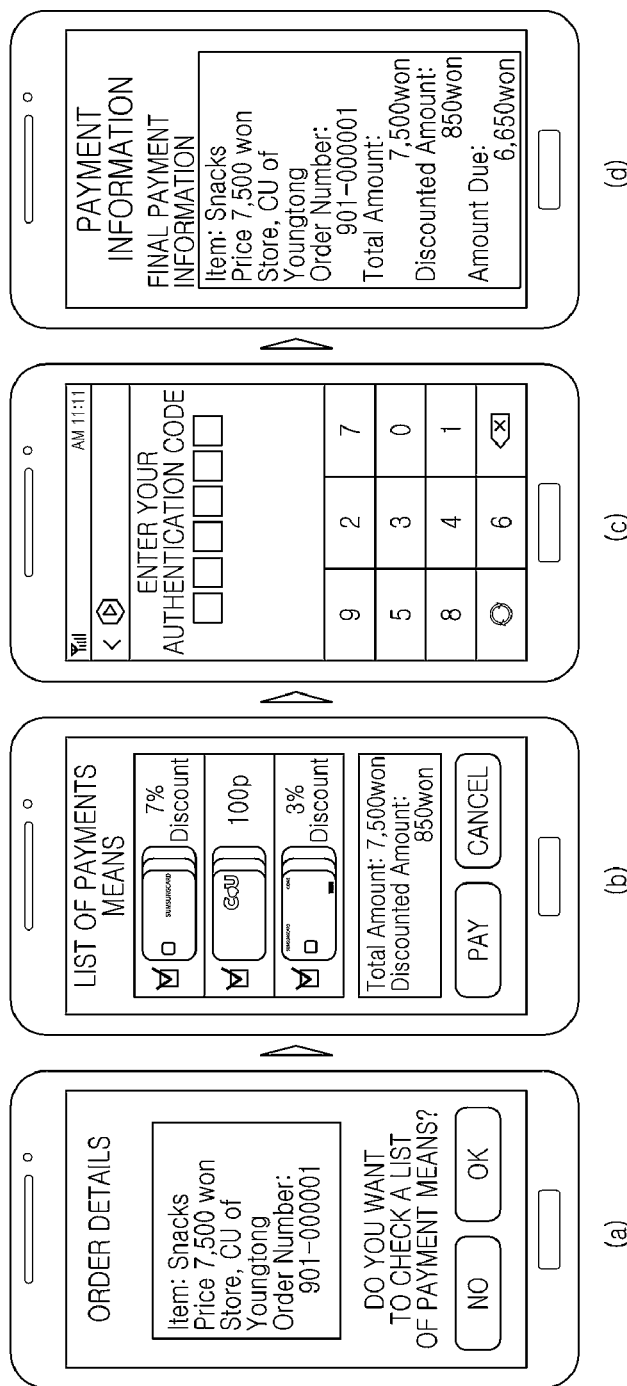

[Fig. 11a]
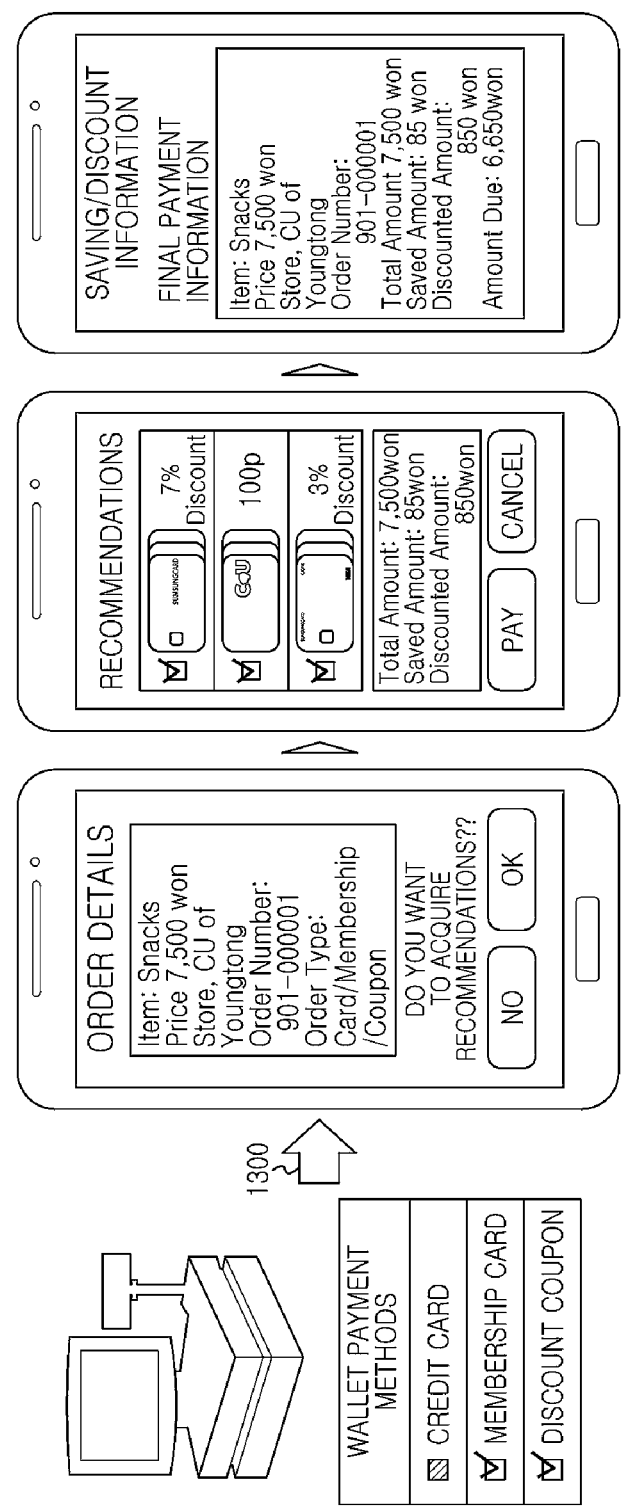

[Fig. 11b]
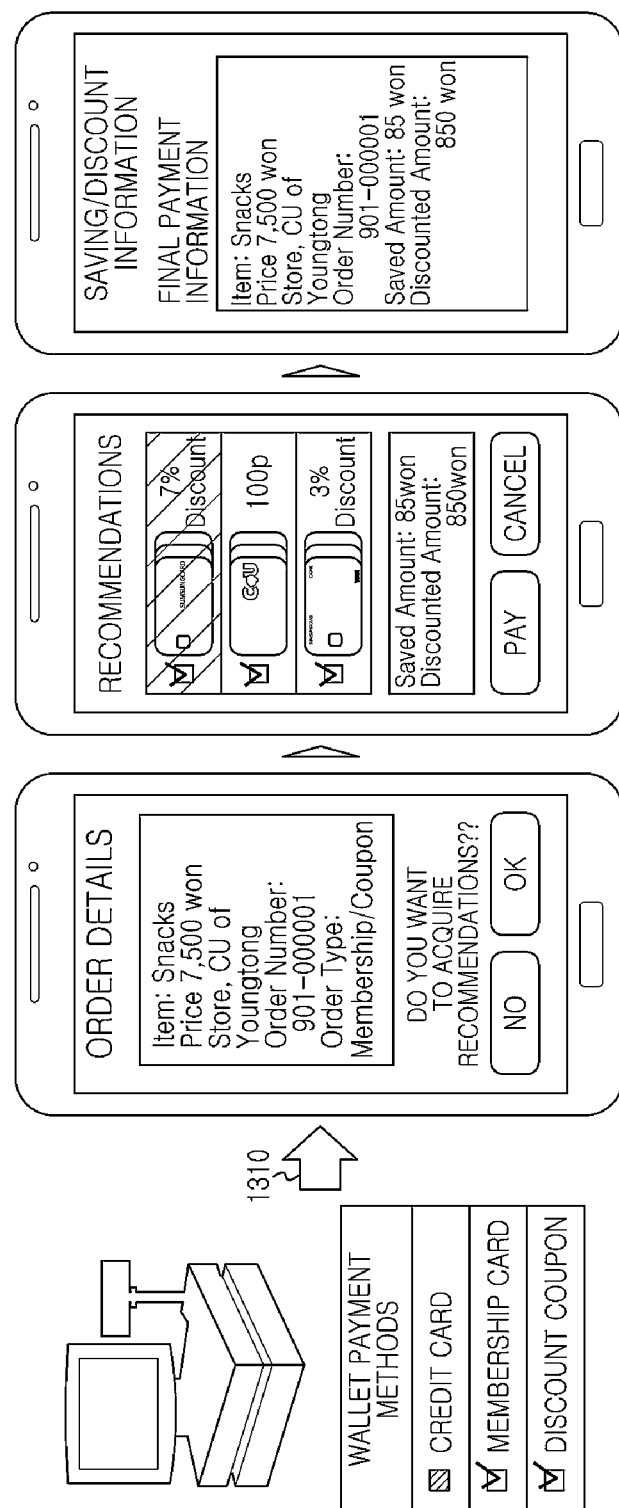

[Fig. 11c]
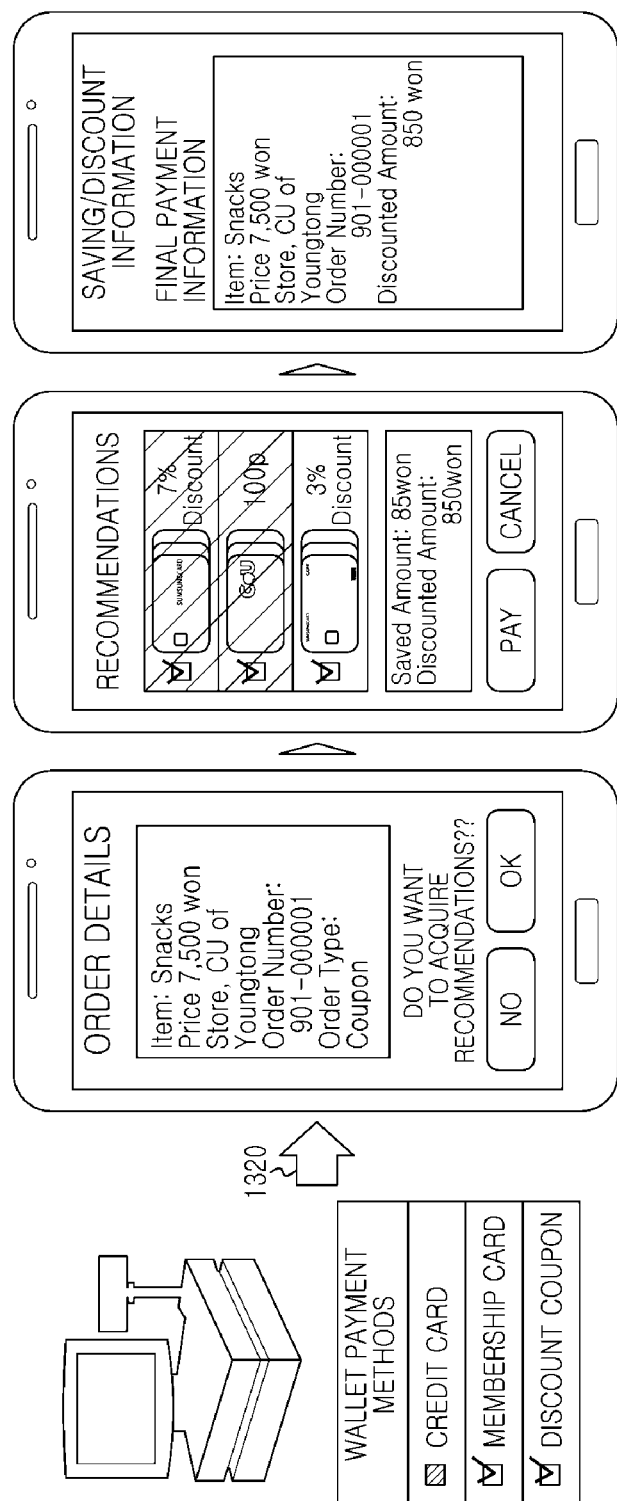

[Fig. 12]
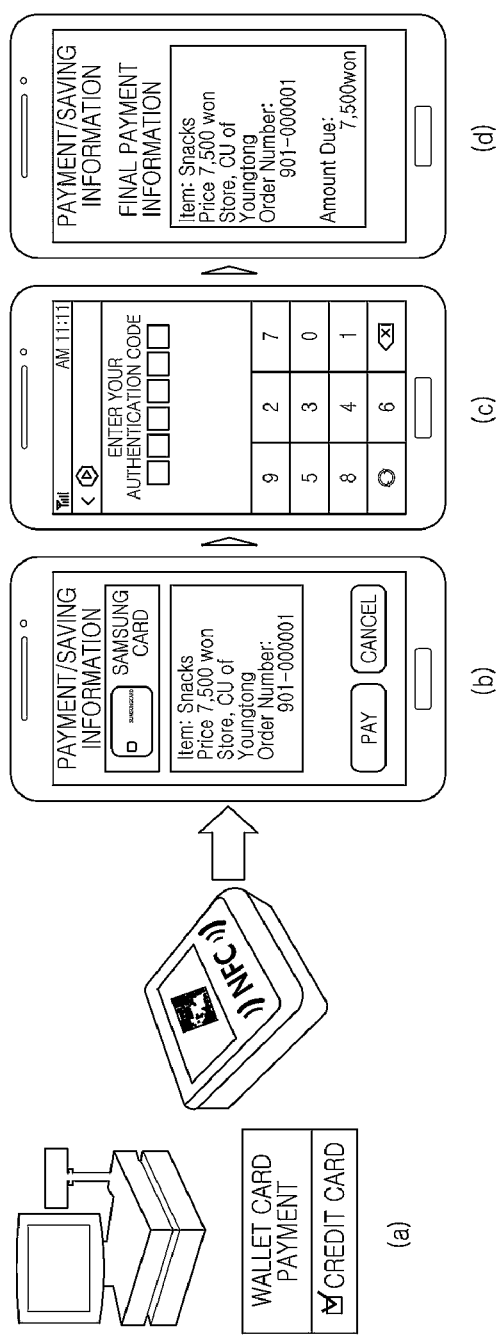

[Fig. 13]
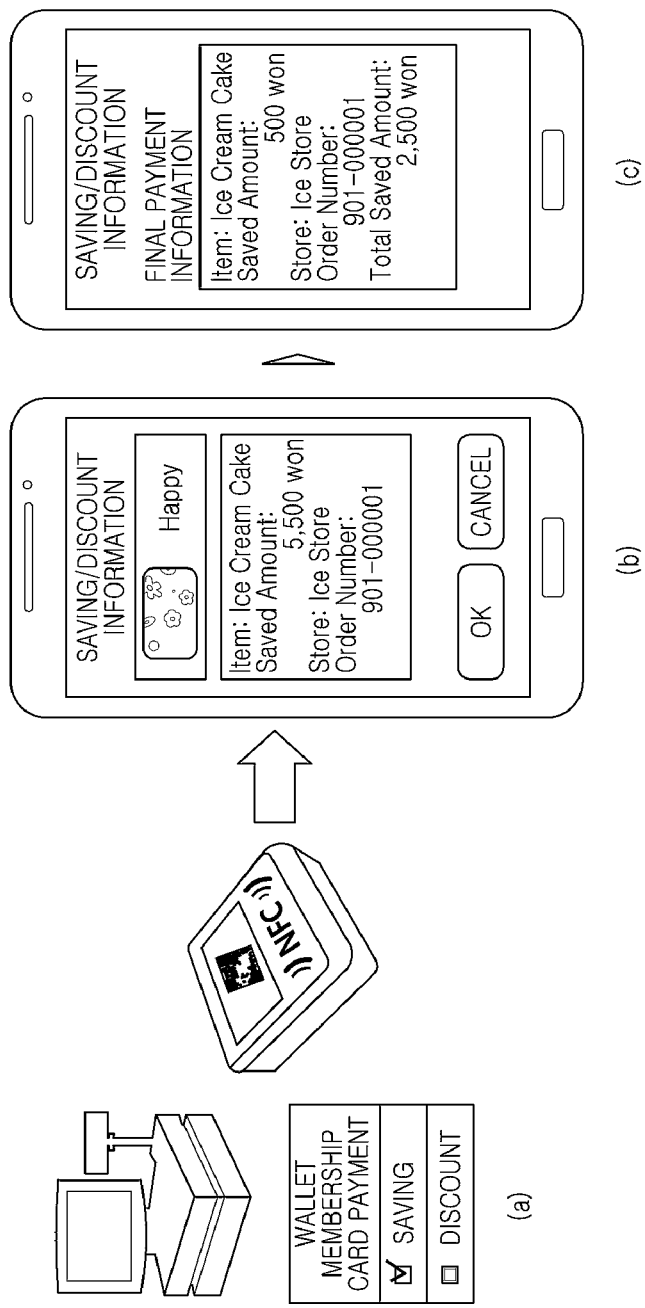

[Fig. 14]
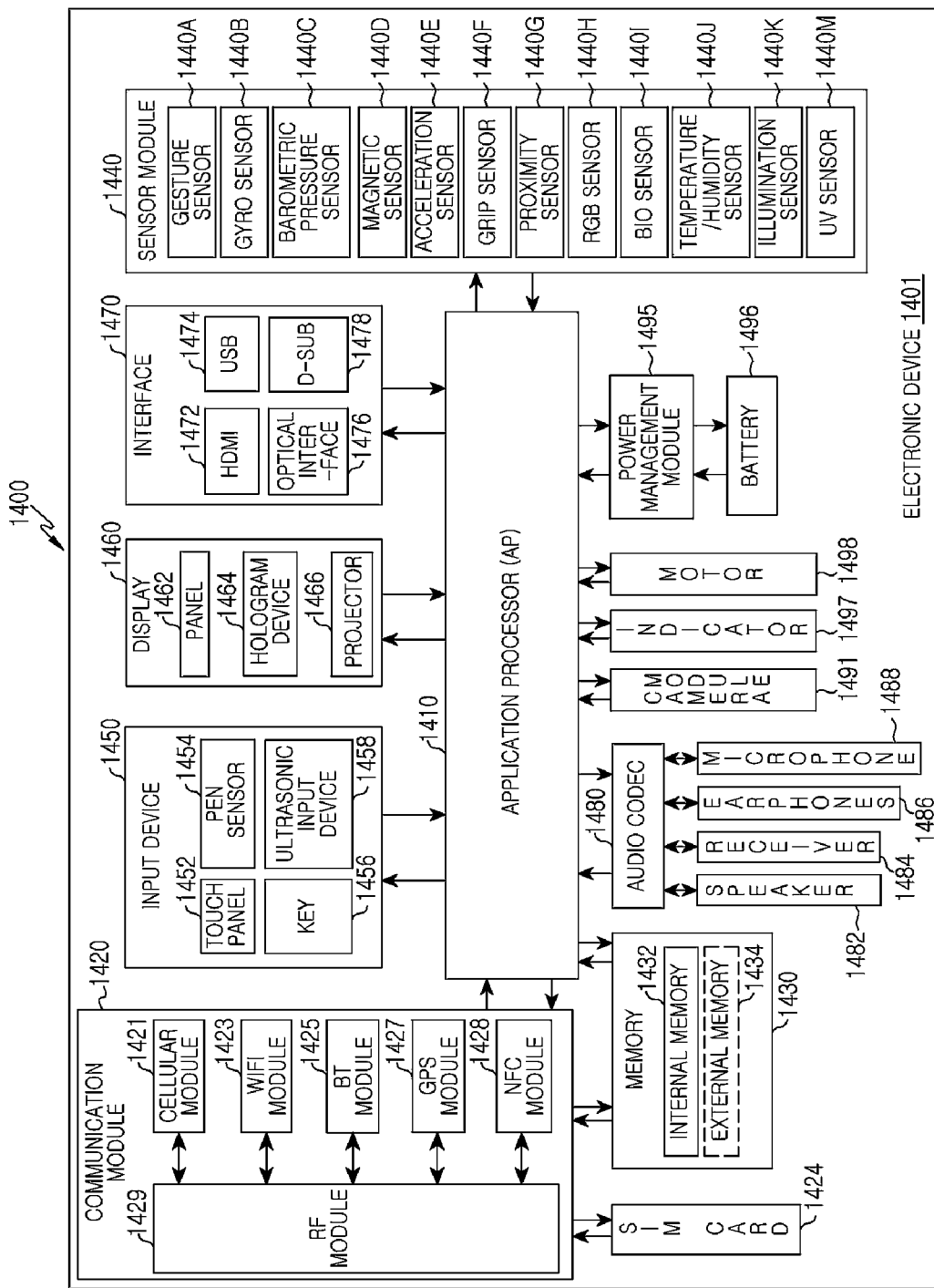

PAYMENT METHOD, PAYMENT APPARATUS, AND PAYMENT SYSTEM USING ELECTRONIC WALLET

TECHNICAL FIELD

Exemplary embodiments of the present disclosure relate to an electronic wallet service, which transmits payment information, such as an affiliated store, a payment item, and an amount due, to an electronic wallet application in a user's electronic device via an order information transmitting device (for example, Near Field Communication (NFC), a Quick Response (QR) code or barcode display device, Bluetooth, Infrared Data Association (IrDA), or WiFi), which is electrically connected with a Point Of Sales (POS) terminal, and which optimizes personally collected contents of the electronic wallet such as membership, coupon, etc. and uses the contents as a means for paying of the electronic wallet (online payment), thereby providing an integrated service of payment, discount, and saving.

BACKGROUND ART

In general, payment with a credit card may be made by calculating an amount due for a purchased or consumed item at a POS terminal of a store, and requesting a server to authenticate a means for paying (for example, a user's credit card) and make payment. The corresponding payment information may be transmitted to the server of a bank or a card company via a Value Added Network (VAN) connected with the POS terminal. The amount due is approved by the server of the card company (or bank) and then the payment is made by transmitting a secondary user authentication (for example, a signature) from the POS terminal to the server via the VAN.

In the card payment method, a payment process starts and ends with a POS terminal of an offline affiliated store. The card payment method is not possible without exact processing and linking between the POS terminal, the VAN, and the card company, and may make it difficult for users to select various services or benefits (for example, membership, discount coupons, and saving of reward points) by the influence of respective stakeholders.

DISCLOSURE OF INVENTION

Solution to Problem

The card payment method is more prone to the risk of illegal use of an offline payment method (a payment means) using a credit card and the risk of leakage of personal information. For example, the card payment method may be used again illegally online/offline based on pre-settled payment details (for example, a card number, an expiration date, a CVS code, etc.). In addition, in the card payment method, a credit card of a magnetic method may be cloned and used illegally. In addition, since the card may be used as a means for identifying personal information, the personal information is likely to be leaked when the card is stolen or lost.

In addition, in the card payment method, it may be difficult to exactly identify a real cardholder. For example, the current method for identifying a real cardholder is comparing signature information written on the back of the card and a signature which is presented as a secondary identifying means when payment is made. However, the signature may be easily forged or falsified and thus it is difficult to identify use of a person other than the real cardholder.

In addition, the card payment method separately manages online/offline payment methods and separately processes a credit card and a reward point saving/discount card (or a membership card). For example, the user of the card payment method has difficulty in using the online electronic payment method and the offline card in parallel and thus should use different payment means according to payment methods. In addition, in the case of an affiliated store which provides a reward point benefit or a discount benefit, the user should present a payment card in addition to a valid membership discount card or coupon corresponding to the affiliated store, and thus payment, discount, and saving are separately managed. In addition, when the coupon or membership card is not recognized by the POS terminal, there is a problem that relevant data should be manually input by a person.

That is, the user should always carry the membership card, know the affiliated store where a membership card is applied, a discount rate, etc., and present the credit card and the membership card (or coupon) simultaneously when making payment for items, which may cause inconvenience to the user.

To address the above-discussed deficiencies, it is a primary object to provide a method and apparatus for transmitting order information to a user electronic device via an order information transmitting device electrically connected with a POS terminal.

Another object of the present disclosure is to provide a method, apparatus, and system for integrating online/offline payment systems.

Another object of the present disclosure is to provide a method, apparatus, and system for providing payment/saving/discount recommendation information suitable for an integrated online/off payment system.

Another object of the present disclosure is to provide a method and apparatus for paying by using an electronic wallet of an electronic device without using a magnetic credit card in an offline store.

According to an aspect of the present disclosure, a method for paying of an electronic device includes: receiving item order information from a POS terminal; determining a payment method by considering at least one of a discount benefit and a reward point saving benefit based on the received item order information; and requesting a payment approval for the item order information in the determined payment method.

According to another aspect of the present disclosure, a method for paying of a server includes: receiving at least one of item order information and a payment method recommendation information request from an electronic device; determining candidate payment method information which provides a relatively greater benefit of at least one of a discount benefit and a reward point saving benefit based on the item order information; transmitting the determined candidate payment method information to the electronic device.

According to another aspect of the present disclosure, a method for paying of a POS terminal includes: acquiring a purchase item of a user; generating item order information based on the purchase item of the user; and transmitting the item order information to an electronic device of the user.

According to another aspect of the present disclosure, an electronic device includes: a communication interface; and a processor, wherein the processor is configured to: receive item order information from a POS terminal through the communication interface; determine a payment method by considering at least one of a discount benefit and a reward point saving benefit based on the received item order information; and request a payment approval for the item order information in the determined payment method.

According to another aspect of the present disclosure, a server device includes: a communication interface; and a processor, wherein the processor is configured to: receive at least one of item order information and a payment method recommendation information request from an electronic device; determine candidate payment method information which provides a relatively greater benefit of at least one of a discount benefit and a reward point saving benefit based on the item order information; transmit the determined candidate payment method information to the electronic device.

According to another aspect of the present disclosure, a POS terminal device includes: a communication interface; and a processor, wherein the processor is configured to: acquire a purchase item of a user; generate item order information based on the purchase item of the user; and transmit the item order information to an electronic device of the user.

BRIEF DESCRIPTION OF DRAWINGS

For a more complete understanding of the present disclosure and its advantages, reference is now made to the following description taken in conjunction with the accompanying drawings, in which like reference numerals represent like parts:

FIG. 1 illustrates a network environment including an electronic device according to various exemplary embodiments of the present disclosure;

FIG. 2 illustrates a block diagram showing a payment module of an electronic device according to various exemplary embodiments of the present disclosure;

FIG. 3 illustrates a signal flowchart of a payment system according to various exemplary embodiments of the present disclosure;

FIG. 4 illustrates a payment flowchart for purchasing an item of a POS terminal according to various exemplary embodiments of the present disclosure;

FIG. 5 illustrates a payment flowchart for purchasing an item of an electronic device according to various exemplary embodiments of the present disclosure;

FIG. 6 illustrates a payment flowchart for purchasing an item of a wallet server according to various exemplary embodiments of the present disclosure;

FIG. 7 illustrates a payment flowchart for purchasing an item of a wallet server according to various exemplary embodiments of the present disclosure;

FIGS. 8A and 8B illustrate views showing a method for providing order information to an electronic device of a user at a POS terminal according to various exemplary embodiments of the present disclosure;

FIG. 9 illustrates a view showing a User Interface (UI) for purchasing an item according to various exemplary embodiments of the present disclosure;

FIG. 10 illustrates a view showing a UI for purchasing an item according to various exemplary embodiments of the present disclosure;

FIGS. 11A, 11B and 11C illustrate a view showing an example of a process for paying for an item when a user purchases the item in a store where complex payment is possible according to various exemplary embodiments of the present disclosure;

FIG. 12 illustrates a view showing an example of a process for paying for an item when a user purchases the item in a store where payment is possible only with a credit card payment according to various exemplary embodiments of the present disclosure;

FIG. 13 illustrates a view showing an example of a process for paying for an item when a user purchases the item in a store where payment is possible only with a membership card according to various exemplary embodiments of the present disclosure; and FIG. 14 illustrates a block diagram showing an electronic device according to various exemplary embodiments of the present disclosure.

BEST MODE FOR CARRYING OUT THE INVENTION

Hereinafter, various exemplary embodiments of the present disclosure will be explained with reference to the accompanying drawings. Although specific embodiments of the present disclosure are illustrated in the drawings and relevant detailed descriptions are provided, various changes can be made and various exemplary embodiments may be provided. Accordingly, various exemplary embodiments of the present disclosure are not limited to the specific embodiments and should be construed as including all changes, equivalents or substitutes included in the ideas and technological scopes of exemplary embodiments of the present disclosure. In the explanation of the drawings, similar reference numerals are used for similar elements.

The terms "include" or "may include" used in the exemplary embodiments of the present disclosure indicate the presence of disclosed corresponding functions, operations, elements, and the like, and do not limit additional one or more functions, operations, elements, and the like. In addition, it should be understood that the terms "include" or "have" used in the exemplary embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The term "or" used in the exemplary embodiments of the present disclosure includes any and all combinations of words enumerated with it. For example, "A or B" means including A, including B, or including both A and B.

Although the terms such as "first" and "second" used in the various exemplary embodiments of the present disclosure may modify various elements of the various exemplary embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of the various exemplary embodiments of the present invention, and similarly, a second element may be named a first element.

It will be understood that when an element is mentioned as being "connected" or "coupled" to another element, the element may be directly connected or coupled to another element, and there may be an intervening element between the element and another element. To the contrary, it will be understood that when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various exemplary embodiments of the present disclosure may be a device that is equipped with a communication function. For example, the electronic device may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical machine, a camera, or a wearable device (for example, a head-mounted-device (HMD) such as electronic glasses, electronic clothing, an electronic bracelet, an electronic necklace, an electronic appcessory, electronic tattoos, a POS terminal, or a smart watch).

According to an exemplary embodiment, the electronic device may be a smart home appliance which is equipped with a communication function. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Goggle TV™), a game console, an electronic dictionary, an electronic key, a camcorder, or an electronic album.

According to an exemplary embodiment, the electronic device may include at least one of various medical machines (for example, Magnetic Resonance Angiography (MRA), Magnetic Resonance Imaging (MRI), Computed Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example, navigation equipment for ship, a gyro compass, and the like), avionics, a security device, a head unit for vehicle, an industrial or home robot, an automatic teller machine (ATM) of a financial institution, or POS of a store.

According to an exemplary embodiment, the electronic device may include at least one of a part of furniture or a building/a structure including a communication function, an electronic board, an electronic signature receiving device, a projector, and various measurement devices (for example, devices for measuring water, power, gas, radio waves, and the like). The electronic device according to various exemplary embodiments of the present disclosure may be one or a combination of one or more of the above-mentioned devices. In addition, the electronic device according to various exemplary embodiments of the present disclosure may be a flexible device. In addition, it is obvious to an ordinary skilled person in the related art that the electronic device according to various exemplary embodiments of the present disclosure is not limited to the above-mentioned devices.

Hereinafter, an electronic device according to various exemplary embodiments will be explained with reference to the accompanying drawings. The term "user" used in the various exemplary embodiments may refer to a person who uses the electronic device or a device that uses the electronic device (for example, an artificial intelligence electronic device).

FIG. 1 illustrates a network environment 100 including an electronic device 101 according to various exemplary embodiments.

Referring to FIG. 1, the electronic device 101 may include a bus 110, a processor 120, a memory 130, an input and output interface 140, a display 150, a communication interface 160, and a payment module 170.

The bus 110 may be a circuit which connects the above-described elements with one another and transmits communication (for example, a control message) between the above-described elements.

The processor 120 may receive instructions from the other elements (for example, the memory 130, the input and output interface 140, the display 150, the communication interface 160, or the payment module 170) via the bus 110, decipher the instructions, and perform calculation or data processing according to the deciphered instructions.

The memory 130 may store instructions or data which is received from or generated by the processor 120 or the other elements (for example, the input and output interface 140, the display 150, the communication interface 160, the payment module 170, and the like). For example, the memory 130 may include programming modules such as a kernel 131, middleware 132, an Application Programming Interface (API) 133, an application 134, and the like. Each of the above-described programming modules may be configured by software, firmware, hardware, or a combination of two or more of them.

The kernel 131 may control or manage system resources (for example, the bus 110, the processor 120, the memory 130, and the like) which are used for performing operations or functions implemented in the other programming modules, for example, the middleware 132, the API 133, or the application 134. In addition, the kernel 131 may provide an interface for allowing the middleware 132, the API 133, or the application 134 to access an individual element of the electronic device 101 and control or manage the element.

The middleware 132 may serve as an intermediary to allow the API 133 or the application 134 to communicate with the kernel 131 and exchange data with the kernel 131. In addition, the middleware 132 may perform controlling (for example, scheduling or load balancing) with respect to work requests received from the application 134, for example, by giving priority to use the system resources of the electronic device 101 (for example, the bus 110, the processor 120, the memory 130, and the like) to at least one of the applications 134.

The API 133 may be an interface for allowing the application 134 to control a function provided by the kernel 131 or the middleware 132, and, for example, may include at least one interface or function (for example, instructions) for controlling a file, controlling a window, processing an image, or controlling a text.

According to various exemplary embodiments, the application 134 may include a Short Message Service (SMS)/Multimedia Messaging Service (MMS) application, an email application, a calendar application, a notification application, a health care application (for example, an application for measuring exercise or a blood sugar), an environment information application (for example, an application for providing information on atmospheric pressure, humidity, or temperature), and the like. Additionally or alternatively, the application 134 may be an application related to information exchange between the electronic device 101 and an external electronic device (for example, a POS terminal 102). For example, the application related to the information exchange may include an order information reception application for transmitting specific information to the external electronic device.

The POS terminal 102 is a device that combines the functions of a cash register and a computer terminal, and may not only calculate the amount of sales but also collect and process a variety of information and materials necessary for retail management. In addition, the POS terminal 102 has a barcode reader, which is a barcode auto reading device, attached thereto. That is, the POS terminal 102 may san a barcode printed on or attached to a wrapper of an item though the barcode reader, and automatically display a variety of information on the corresponding item.

According to various exemplary embodiments, the POS terminal 102 may be electrically connected with an order information transmitting device (not shown) (for example, an NFC terminal), and may transmit order information of a user to the electronic device 101 via the order information transmitting device.

The order information reception application may include a function of receiving order information (for example, an item name, a price, affiliated store information, order information, an order type (for example, a card/membership/coupon), information on a discount card or membership card applicable in affiliated stores, and the like) from an external electronic device (for example, the POS terminal 102) when the user of the electronic device 101 requests a calculation. For example, the order information may be converted into a QR code or a barcode and transmitted from the POS terminal 102 to the electronic device 101 through a QR code or barcode recognition application. Input data of the QR code or barcode recognition application may be acquired through a camera module (not shown).

According to various exemplary embodiments, the order information may be transmitted from the POS terminal 102 to the electronic device 101 through a wireless Local Area Network (LAN), 3G/4G mobile communication, WiFi direct communication, Bluetooth communication, or NFC.

The input and output interface 140 may transmit instructions or data input by a user through an input and output device (for example, a sensor, a keyboard or a touch screen) to the processor 120, the memory 130, the communication interface 160, or the payment module 170 through the bus 110, for example. For example, the input and output interface 140 may provide data on a user's touch input through a touch screen to the processor 120. In addition, the input and output interface 140 may output instructions or data received from the processor 120, the memory 130, the communication interface 160, or the payment module 170 through the bus 110 through the input and output device (for example, a speaker or a display). For example, the input and output interface 140 may output voice data processed through the processor 120 to the user through a speaker.

The display 150 may display a variety of information (for example, multimedia data, text data, and the like) for the user.

The communication interface 160 may connect communication between the electronic device 101 and an external device (for example, an electronic device 104 or a server 106). For example, the communication interface 160 may be connected to a network 162 via wireless communication or wire communication to communicate with the external device. The wireless communication may include at least one of Wireless Fidelity (WiFi), Bluetooth (BT), Near Field Communication (NFC), cellular communication (for example, LTE, LTE-A, CDMA, WCDMA, UMTS, WiBro, GSM, and the like), or Infrared Data Association (IrDA). The wire communication may include at least one of a Universal Serial Bus (USB), a High Definition Multimedia Interface (HDMI), a Recommended Standard 232 (RS-232), or plain old telephone service (POTS).

According to an exemplary embodiment, the network 162 may be a telecommunications network. The telecommunications network may include at least one of a computer network, Internet, Internet of things, or a telephone network. According to an exemplary embodiment, a protocol for communicating between the electronic device 101 and the external device (for example, a transport layer protocol, a data link layer protocol or a physical layer protocol) may be supported in at least one of the application 134, the application programming interface 133, the middleware 132, the kernel 131, or the communication interface 160.

A payment server 103 is the concept of a device which includes at least one of a card company server, a financial institution server, a transportation facility server, and a mobile payment server, which carry out electronic payments. The payment server 103 may be implemented by using at least one of the card company server, the financial institution server, the transportation facility server, and the mobile payment server. The payment server 103 may perform a payment process by reflecting coupon information and a discount rate in a payment approval request signal received from the POS terminal 102, and then, may transmit a payment approval result to the electronic device 101 and the POS terminal 102. The payment server 103 may deduct the amount corresponding to the payment approval request signal from a prepaid expense which is charged in a subscriber identification device mounted in the electronic device 101, or a predetermined postpaid expense.

A VAN server 104 is a server which is run by a VAN operator, and is connected among a wallet server 105 connected via a VAN, the payment server 103 connected to the VAN, and a membership server 106 to relay request information of the POS terminal 102 and exchange data to make electronic payments.

According to various exemplary embodiments, the payment server 103 and the wallet server 105 or the membership server 106 and the wallet server 105 may be connected to each other via the network 162 rather than via the VAN.

The wallet server 105 may provide payment combination recommendation information (for example, a combination of a payment card and a membership card which can provide more reward points or a higher discount rate) corresponding to order information of the electronic device 101 to the electronic device 101. The wallet server 105 may process payment by considering a payment card, a membership card, a coupon, and the like in response to a payment approval request of the electronic device 101. The wallet server 105 may request the payment server 103 or the membership server 106 to approve the payment according to the result of the processing of the payment.

According to various exemplary embodiments, the entirety or part of the functions of the wallet server 105 may be implemented (or substituted) in the electronic device 101. For example, the wallet server 105 and the electronic device 101 may be implemented as a single device.

The membership server 106 may refer to a device of the concept of including a reward point or coupon server. The membership server 106 may save up the reward points corresponding to the amount paid by the user in user's identification information or deduct saved reward points from an estimated amount. The membership server 106 may provide or reserve a coupon indicating a discount rate for a specific affiliated store or specific item.

According to various exemplary embodiments, the membership card 106 and the payment server 103 may be integrated into a single server or the membership server 106 may be omitted from the network elements in a network environment in which any membership card is not supported.

According to an exemplary embodiment, the wallet server 104 may support the driving of the electronic device 101 by performing at least one of the operations (or functions) implemented in the electronic device 101.

The payment module 170 may process at least part of the information acquired from the other elements (for example, the processor 120, the memory 130, the input and output interface 140, the communication interface 160, and the like), and provide the information to the user in various methods. For example, the payment module 170 may control at least some function of the electronic device 101 by using the processor 102 or independently therefrom to have the electronic device 101 interwork with other electronic devices (for example, the POS terminal 102 or the wallet server 105). Additional information on the payment module 170 will be provided later with reference to FIG. 2.

FIG. 2 illustrates a block diagram 200 of a payment module 170 of an electronic device (for example, the electronic device 101) according to various exemplary embodiments.

Referring to FIG. 2, the payment module 170 may include a first reception module 210, a first transmission module 220, a second reception module 230, a second transmission module 240, and a selection module 250.

The first reception module 210 may receive order information from the POS terminal 102.

According to various exemplary embodiments, the first reception module 210 may recognize the order information included in a QR code or a barcode by scanning the QR code or the barcode corresponding to the order information.

According to various exemplary embodiments, the first reception module 210 may receive the order information from an order information transmitting device (not shown) of the POS terminal 102 via an NFC tag (for example, by placing the electronic device 101 including an NFC module close to the POS terminal 102 including an NFC module within a predetermined distance). According to an exemplary embodiment, the order information transmitting device may be a device separate from the POS terminal 102 and may be electrically connected with the POS terminal 102, but may be physically separated therefrom. For example, the order information transmitting device may be placed on a location where it is easy for the user to access.

According to various exemplary embodiments, the order information may include at least one of a list of items purchased by the user, prices of items (or an amount due), the name of an affiliated store, an order number, a membership card, coupon information, price discount information which are applicable in the affiliated store, and an order type (card/membership/coupon). When the membership card, the coupon information, and the price discount information which are applicable in the affiliated store are managed as database information of the wallet server 105, they may not be included in the order information.

The first transmission module 220 may transmit the order information received from the POS terminal 102 to the wallet server 105. In this case, the first transmission module 220 may request payment combination recommendation information from the wallet server 105 in response to a result of selection of the selection module 250.

The second reception module 230 may receive the payment combination recommendation information from the wallet server 105. The payment combination recommendation information may be information on a payment combination that provides the highest discount benefit or has the most reward points saved from among a plurality of payment cards, membership cards, and coupons that the user of the electronic device 101 holds. The payment combination recommendation information may include various combinations according to various criteria such as reward points/discount rate/user preference, and a method for determining a payment combination according to various exemplary embodiments is not limited to any specific method.

The second transmission module 240 may request a payment approval for the order information from the wallet server 105 based on a payment method selected by the selection module 250. For example, when a credit card A, a coupon B, and a membership card C are selected by the selection module 250 as a payment method, the second transmission module 240 may request the payment approval for the credit card A, the coupon B, and the membership card C.

When the payment combination recommendation information is requested from the wallet server 105, the selection module 250 may display the payment combination recommendation information received from the wallet server 105. The selection module 250 may select the payment method from the payment combination recommendation information according to a user input. According to various exemplary embodiments, when the payment combination recommendation information is not requested from the wallet server 105, the selection module 250 may display information on the credit cards, coupons, and membership cards that the user holds in the user's electronic wallet stored in an internal memory, and then select information corresponding to the user input.

According to various exemplary embodiments, when the payment combination recommendation information is not requested from the wallet server 105, the selection module 250 may extract payment combination information preferred by the user from the information on the credit cards, coupons, and membership cards that the user holds in the user's electronic wallet stored in the internal memory.

FIG. 3 illustrates a signal flowchart of a payment system according to various exemplary embodiments.

Referring to FIG. 3, when a user makes a request for purchase of an item, a first electronic device (for example, the POS terminal 102) may acquire an item purchased by the user and transmit item order information to a second electronic device (for example, a user's portable terminal) (301). The item order information may include at least one of an item name, a price, affiliated store information, order information, an order type (card/membership/coupon), and information on a discount card or a membership card applicable in the affiliated store.

According to various exemplary embodiments, the order information may be transmitted from the first electronic device to the second electronic device via a wireless LAN, 3G/4G mobile communication, WiFi direct communication, Bluetooth communication, or NFC.

The second electronic device may transmit the item order information to a wallet server and request a payment approval for the order of the item according to whether the second electronic device requests payment combination recommendation information from the wallet server (320) or does not request the payment combination recommendation information from the wallet server (330).

For example, when the second electronic device requests the payment combination recommendation information from the wallet server (320), the second electronic device may transmit the item order information received from the first electronic device and a payment combination recommendation information request to the wallet server (302). The wallet server may transmit, to the second electronic device, payment combination recommendation information which provides the highest discount rate or has the most reward points saved, based on the item order information and the credit cards, discount coupons, and membership cards that the user of the second electronic device holds (303).

According to various exemplary embodiment, the wallet server may transmit every possible payment combination or a part of possible payment combinations with reference to the discount rate or reward points.

The second electronic device may transmit a payment approval request to the wallet server by using the payment combination recommendation information received from the wallet server (304).

When the second electronic device does not request the payment combination recommendation information from the wallet server (330), the second electronic device may transmit the payment approval request to the wallet server by using payment method information available to the user of the second electronic device (304).

The wallet server may transmit the payment approval request to a payment server via a VAN server based on the payment method information transmitted by the second electronic device (306). The payment server may transmit a payment approval result to the wallet server via the VAN server in response to the payment approval request (307).

The wallet server may transmit the payment approval request to a membership server via the VAN server or directly without passing through the VAN server, based on the payment method information transmitted by the second electronic device (308). The membership server may transmit a payment approval result to the wallet server via the VAN server or directly without passing through the VAN server in response to the payment approval request (309).

The wallet server may transmit the payment approval result for the item order to the second electronic device, based on the payment approval result of the payment server and the payment approval result of the membership server (310).

In addition, the first electronic device may receive the payment approval result for the item order of the user from the payment server or the membership server (311).

FIG. 4 illustrates a payment flowchart for purchasing an item of a POS terminal according to various exemplary embodiments of the present disclosure.

Referring to FIG. 4, in operation 400, a POS terminal (for example, the POS terminal 102 of FIG. 1 or the first electronic device of FIG. 3) may collect an order item of a user by scanning a barcode attached to the item that the user intends to purchase.

In operation 402, the POS terminal may generate order information on the collected user's order item. For example, the order information may include at least one of an item name, an item price, the name of an affiliated store, an order number, and various benefits provided by the affiliated store. When at least one piece of information related to the information on the various benefits provided by the affiliated store is managed in a wallet server as a database, the information on the various benefits provided by the affiliated store may not be included in the order information. For example, the at least one piece of information related to the information on the various benefits provided by the affiliated store may include information on the credit cards, coupons, and membership cards that the user of the electronic device holds and benefit information (for example, discount benefit card information) provided by the corresponding affiliated store.

In operation 404, the POS terminal may transmit the order information to the electronic device of the user. For example, the order information may be converted into a QR code or a barcode and transmitted via a QR code or barcode recognition module of the electronic device of the user.

According to various exemplary embodiments, the POS terminal may transmit the order information to the electronic device of the user via an order transmitting device of the POS terminal (for example, an NFC communication terminal, a Bluetooth communication device, an IrDA communication device).

According to various exemplary embodiments, the POS terminal may transmit the order information to the electronic device of the user in various communication methods in addition to the QR code, barcode, and NFC.

In operation 406, the POS terminal may determine whether a payment approval request is completed by the user.

When the payment approval request is completed by the user in operation 406, the POS terminal may receive a payment approval result for the order information of the user from a payment server or a membership server in operation 408. In addition, the POS terminal may receive information on a discounted price for the user's purchased item or saved reward points in operation 408. For example, the payment approval result may be a receipt.

FIG. 5 illustrates a payment flowchart for purchasing an item of an electronic device according to various exemplary embodiments of the present disclosure.

Referring to FIG. 5, in operation 500, an electronic device (for example, the electronic device 101 of FIG. 1 or the second electronic device of FIG. 3) may receive user's order information from an order transmitting device of a POS terminal (for example, an NFC communication terminal, a QR code or barcode display device, a Bluetooth communication device, an IrDA communication device).

In operation 502, the electronic device may determine whether to identify payment combination recommendation information from a wallet server.

When the electronic device determines to identify the payment combination recommendation information in operation 502, the electronic device may transmit the user's order information and a payment combination recommendation information request to the wallet server in operation 504.

In operation 506, the electronic device may receive the payment combination recommendation information from the wallet server. The payment combination recommendation information may include at least one of combinations that provide the highest discount rate and have the most reward points saved from among the combinations of the credit cards, discount coupons, and the membership cards that the user holds.

In operation 508, the electronic device may select a payment method from the payment combination recommendation information received from the wallet server according to a user input.

In operation 510, the electronic device may detect authentication information from a user input. For example, the authentication information may be a number input or a certificate stored in the electronic device.

In operation 512, the electronic device may transmit the selected payment method and the detected authentication information to the wallet server.

When the electronic device determines not to acquire the payment combination recommendation information in operation 502, the electronic device may display a list of payment methods of the user stored in the electronic device (for example, a credit card, a coupon, a membership, and the like) in operation 514.

In operation 516, the electronic device may select a payment method from the list of payment methods of the user according to a user input.

In operation 518, the electronic device may detect authentication information from a user input. For example, the authentication information may be a number input or a certificate stored in the electronic device.

In operation 520, the electronic device may transmit the selected payment method and the detected authentication information to the wallet server.

In operation 522, the electronic device may receive an authentication result corresponding to the authentication information from the wallet server.

In operation 524, when the authentication succeeds, the electronic device may transmit information for requesting a payment approval for the order information of the user to the wallet server.

In operation 526, the electronic device may receive a payment approval result from a payment server or a membership server. For example, the payment approval result may be used as a receipt.

FIG. 6 illustrates a payment flowchart for purchasing an item of a wallet server according to various exemplary embodiments of the present disclosure.

Referring to FIG. 6, in operation 600, the wallet server may receive order information of a user and a payment combination recommendation information request.

In operation 602, the wallet server may determine a payment combination that provides the highest discount benefit and has the most reward points saved based on information on the credit cards, coupons, and membership card that the user holds.

In operation 604, the wallet server may recommend the determined payment combination to the electronic device of the user.

In operation 606, the wallet server may receive payment method information selected by the user and authentication information.

In operation 608, the wallet server may determine whether the authentication information of the user is valid or not and may transmit the result of the determining to the electronic device.

In operation 610, when the authentication information of the user is valid, the wallet server may receive information for requesting a payment approval for the order information from the electronic device.

In operation 612, the wallet server may transmit the payment approval request information received from the electronic device to at least one of a payment server and a membership server.

In operation 614, the wallet server may receive a payment approval result from the payment server or the membership server.

In operation 616, the wallet server may transmit the payment approval result to the electronic device of the user.

FIG. 7 illustrates a payment flowchart for purchasing an item of a wallet server according to various exemplary embodiments of the present disclosure.

Referring to FIG. 7, in operation 700, the wallet server may receive order information of a user from the electronic device of the user.

In operation 702, the wallet server may receive payment method information selected by the user and authentication information.

In operation 704, the wallet server may determine whether the authentication information of the user is valid or not and transmit the result of the determining to the electronic device.

In operation 706, when the authentication information of the user is valid, the wallet server may receive information for requesting a payment approval for the order information from the electronic device.

In operation 708, the wallet server may transmit the payment approval request information received from the electronic device to at least one of a payment server and a membership server.

In operation 710, the wallet server may receive a payment approval result from the payment server or the membership server.

In operation 712, the wallet server may transmit the payment approval result to the electronic device of the user.

FIGS. 8A and 8B illustrate views showing a method for providing order information to an electronic device of a user at a POS terminal according to various exemplary embodiments of the present disclosure.

Referring to FIG. 8A, order information 800 generated in a POS terminal (for example, the POS terminal 102 of FIG. 1 or the first electronic device of FIG. 3) may be made of a QR code 810 or a barcode 820 and transmitted to an electronic device of a user. For example, the order information 800 generated in the POS terminal may be transmitted to a QR code or barcode recognition module 830 (for example, a camera module) of the electronic device of the user. For example, the order information 800 may include an item name, a price, affiliated store information, an order number, and benefit information which is provided by the affiliated store when necessary.

Referring to FIG. 8B, the order information 800 generated in the POS terminal may be stored in an NFC module 840 of the POS terminal. When an NFC module 850 of the electronic device of the user is tagged with the NFC module 840 of the POS terminal, the order information of the user stored in the NFC module 840 of the POS terminal may be transmitted to the electronic device.

FIG. 9 illustrates a view showing a UI for purchasing an item according to various exemplary embodiments of the present disclosure.

As shown in view (a) of FIG. 9, an electronic device of a user (for example, the electronic device 101 of FIG. 1 or the second electronic device of FIG. 3) may display order information of the user received from a POS terminal.

When the user wants to acquire payment combination recommendation information from a server in view (a) of FIG. 9, that is, when an input of an "OK" button for acquiring recommendation information is detected, the electronic device may display payment combination recommendation information received from a wallet server as shown in view (b) of FIG. 9. For example, the electronic device may display payment methods showing that "a 7% discount is applicable if a payment is made with a credit card", "100 rewards points will be saved in the membership card", and "a 3% discount is applicable via other affiliated cards." The electronic device may determine a payment method based on user selection on the displayed payment combination recommendation information.

When the payment method is determined by the user input and a "payment" approval request is selected in view (b) of FIG. 9, the electronic device may display an authentication code input screen as shown in view (c) of FIG. 9. In this case, the user may input an authentication code via a virtual keypad included in the authentication code input screen.

When authentication succeeds based on the payment method and the authentication information transmitted to a payment server or a membership server in views (b) and (c) of FIG. 9, the electronic device may display payment result information as shown in view (d) of FIG. 9. For example, the payment result information may display a total amount before a discount is applied, a discounted amount, an amount due, and the like.

FIG. 10 illustrates a view showing a UI for purchasing an item according to various exemplary embodiments of the present disclosure.

As shown in view (a) of FIG. 10, an electronic device of a user (for example, the electronic device 101 of FIG. 1 or the second electronic device of FIG. 3) may display order information of the user received from a POS terminal (for example, the POS terminal 102 of FIG. 1 or the first electronic device of FIG. 3).

The electronic device may ask whether the user selects a payment method from payment method information of the user stored in the electronic device.

As shown in view (b) of FIG. 10, the electronic device may display payment method information of the user stored in the electronic device. In this case, the electronic device may determine a payment method based on user selection on the displayed payment combination recommendation information. For example, the electronic device may display payment methods showing that "a 7% discount is applicable if payment is made with a credit card", "100 rewards points will be saved in the membership card", and "a 3% discount is applicable via other affiliated cards."

When the payment method is determined by the user input and a "payment" approval request is selected in view (b) of FIG. 10, the electronic device may display an authentication code input screen as shown in view (c) of FIG. 10. In this case, the user may input an authentication code via a virtual keypad included in the authentication code input screen.

When authentication succeeds based on the payment method and the authentication information transmitted to a payment server or a membership server in views (b) and (c) of FIG. 10, the electronic device may display payment result information as shown in view (d) of FIG. 10. For example, the payment result information may display a total amount before a discount is applied, a discounted amount, an amount due, and the like.

According to various exemplary embodiments, although the item payment method may be selected by the user input in the electronic device, the item payment method may be selected in a POS terminal by a clerk of a store as shown in FIGS. 11 to 13.

FIGS. 11A, 11B and 11C illustrate a view showing an example of a process for paying for an item when a user purchases the item in a store where complex payment is possible according to various exemplary embodiments of the present disclosure.

Referring to FIGS. 11A, 11B and 11C, a clerk of a store may acquire an item purchased by a user by using a barcode scanner or directly inputting. The clerk may select a payment method by asking the user about the payment method. For example, the clerk may select a credit card, a membership card, and a discount coupon, which are payment methods, according to a user's request.

The clerk may operate a POS terminal to transmit order information (for example, a purchase item name, an item price, the name of an affiliated store, an order number, and an order type) to the electronic device of the user via an order information transmitting device of the POS terminal. The electronic device of the user may display the order information received from the POS terminal. When recommendation information is requested, the electronic device of the user may display the payment methods of the user based on the order type. The electronic device of the user may display a payment approval result when the POS terminal requests payment.

Referring to FIG. 11A, when a credit card, a membership card, and a discount coupon are selected, the electronic device may display recommendation payment method information based on the selected order type as indicated by 1300.

Referring to FIG. 11B, when a membership card and a discount coupon are selected, the electronic device may display recommendation payment method information based on the selected order type as indicated by 1310.

Referring to FIG. 11C, when a discount coupon is selected, the electronic device may display recommendation payment method information based on the selected order type as indicated by 1320.

FIG. 12 illustrates a view showing an example of a process for paying for an item when a user purchases the item in a store where payment is possible only with a credit card according to various exemplary embodiments of the present disclosure.

Referring to FIG. 12, in the store where payment is possible only with a credit card, a payment method of a user is set to a credit card when order information is generated.

A POS terminal (for example, the POS terminal of FIG. 1 or the first electronic device of FIG. 3) may transmit the order information (for example, a purchase item name, an item price, the name of an affiliated store, and an order number) to the electronic device of the user (for example, the electronic device 101 of FIG. 1 or the second electronic device of FIG. 3) via an order information transmitting device (for example, an NFC communication terminal) electrically connected with the POS terminal in view (a) of FIG. 12. The electronic device of the user may display the order information received from the POS terminal. Since the payment method is set to the credit card in view (b) of FIG. 12, the electronic device of the user may display an electronic credit card for paying without having to request complex recommendation payment information. Thereafter, the electronic device may request a payment approval by inputting an authentication number (PIN number) in view (c) of FIG. 12, and receive and display a payment approval result in view (d) of FIG. 12.

FIG. 13 illustrates a view showing an example of a process for paying for an item when a user purchases the item in a store where payment is possible only with a membership card according to various exemplary embodiments of the present disclosure.

Referring to FIG. 13, in the store where payment is possible only with a membership card, one of saving of reward points and a discount may be set when order information is generated.

A POS terminal (for example, the POS terminal 102 of FIG. 1 or the first electronic device of FIG. 3) may transmit the order information (for example, a purchase item name, an item price, the name of an affiliated store, and an order number) to the electronic device of the user (for example, the electronic device 101 of FIG. 1 or the second electronic device of FIG. 3) via an order information transmitting device (for example, an NFC communication terminal) electrically connected with the POS terminal in view (a) of FIG. 13. The electronic device of the user may display the order information received from the POS terminal. The electronic device of the user may display information on a membership card which is applicable in the corresponding store in view (b) of FIG. 13, and then display the result of saving of the reward points/applying of the discount in view (c) of FIG. 13.

FIG. 14 illustrates a block diagram 1400 of an electronic device 1401 according to various exemplary embodiments. The electronic device 1401 may configure the entirety or part of the electronic device 101 shown in FIG. 1. Referring to FIG. 14, the electronic device 1401 may include one or more Application Processors (APs) 1410, a communication module 1420, a Subscriber Identification Module (SIM) card 1124, a memory 1430, a sensor module 1440, an input device 1450, a display 1460, an interface 1470, an audio module 1480, a camera module 1491, a power management module 1495, a battery 1496, an indicator 1497, or a motor 1498.

The AP 1410 may control a plurality of hardware or software elements connected to the AP 1410 by driving an operating system or an application program, and may process and calculate a variety of data including multimedia data. For example, the AP 1410 may be implemented by using a System on Chip (SoC). According to an exemplary embodiment, the AP 1410 may further include a Graphic Processing Unit (GPU) (not shown).

The communication module 1420 (for example, the communication interface 160) may transmit and receive data via communication between the electronic device 1401 (for example, the electronic device 101) and other electronic devices (for example, the POS terminal 102 or the servers 103-106) connected through a network. According to an exemplary embodiment, the communication module 1420 may include a cellular module 1421, a WiFi module 1423, a BT module 1425, a GPS module 1427, an NFC module 1428, and a Radio Frequency (RF) module 1429.

The cellular module 1421 may provide a voice call, a video call, a text service, or an internet service through a telecommunications network (for example, LTE, LTE-A, CDMA, WCDMA, UMTS, WiBro, GSM, and the like). In addition, the cellular module 1421 may identify and authenticate the electronic device in the telecommunications network by using a subscriber identification module (for example, the SIM card 1424). According to an exemplary embodiment, the cellular module 1421 may perform at least some of the functions provided by the AP 1410. For example, the cellular module 1421 may perform at least some of the multimedia control functions.

According to an exemplary embodiment, the cellular module 1421 may include a Communication Processor (CP). In addition, the cellular module 1421 may be implemented by using a SoC, for example. In FIG. 14, the cellular module 1421 (for example, the communication processor), the memory 1430, or the power management module 1495 are elements separate from the AP 1410. However, according to an exemplary embodiment, the AP 1410 may be configured to include at least some of the above-described elements (for example, the cellular module 1421).

According to an exemplary embodiment, the AP 1410 or the cellular module 1421 (for example, the communication processor) may load instructions or data received from a non-volatile memory connected therewith or at least one of the other elements into a volatile memory, and may process the instructions or data. In addition, the AP 1410 or the cellular module 1421 may store data which is received from at least one of the other elements or generated by at least one of the other elements in the non-volatile memory.

The WiFi module 1423, the BT module 1425, the GPS module 1427, or the NFC module 1428 each may include a processor for processing data received and transmitted through a corresponding module. In FIG. 14, the cellular module 1421, the WiFi module 1423, the BT module 1425, the GPS module 1427, or the NFC module 1428 is illustrated in a separate block. However, according to an exemplary embodiment, at least some (for example, two or more) of the cellular module 1421, the WiFi module 1423, the BT module 1425, the GPS module 1427, or the NFC module 1428 may be included in a single integrated chip (IC) or a single IC package. For example, at least some of the processors corresponding to the cellular module 1421, the WiFi module 1423, the BT module 1425, the GPS module 1427, and the NFC module 1428 (for example, the communication processor corresponding to the cellular module 1421 and the WiFi processor corresponding to the WiFi module 1423) may be implemented by using a single SoC.

The RF module 1429 may transmit and receive data, for example, may transmit and receive an RF signal. Although not shown, the RF module 1429 may include a transceiver, a Power Amp Module (PAM), a frequency filter, or a Low Noise Amplifier (LNA), for example. In addition, the RF module 1429 may further include a part for exchanging electromagnetic waves in a free space in wireless communication, for example, a conductor or conducting wire. In FIG. 14, the cellular module 1421, the WiFi module 1423, the BT module 1425, the GPS module 1427, and the NFC module 1428 share the single RF module 1429 with one another. However, according to an exemplary embodiment, at least one of the cellular module 1421, the WiFi module 1423, the BT module 1425, the GPS module 1427, or the NFC module 1428 may transmit and receive an RF signal through a separate RF module.

The SIM card 1424 may be a card including a subscriber identification module, and may be inserted into a slot formed on a specific location of the electronic device. The SIM card 1424 may include its unique identification information (for example, an Integrated Circuit Card Identifier (ICCID)) or subscriber information (for example, International Mobile Subscriber Identity (IMSI)).

The memory 1430 (for example, the memory 130) may include an internal memory 1432 or an external memory 1434. For example, the internal memory 1432 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, and the like).

According to an exemplary embodiment, the internal memory 1432 may be a Solid State Drive (SSD). The external memory 1434 may further include a flash drive, for example, Compact Flash (CF), Secure Digital (SD), Micro-SD, Mini-SD, extremeDigital (xD), a memory stick, and the like. The external memory 1434 may be functionally connected with the electronic device 1401 through various interfaces. According to an exemplary embodiment, the electronic device 1401 may further include a storage device (or a storage medium) such as a hard drive.

The sensor module 1440 may measure a physical quantity or detect an operation state of the electronic device 1401, and may convert measured or detected information into electric signals. The sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, a proximity sensor 1440G, a color sensor 1440H (e.g., Red, Green, Blue (RGB) sensor), a biosensor 1440I, a temperature/humidity sensor 1440J, an illumination sensor 1440K, and a Ultraviolet (UV) sensor 1440M. Additionally or alternatively, the sensor module 1440 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), a fingerprint sensor (not shown), and the like. The sensor module 1440 may further include a control circuit to control at least one sensor included therein.

The input device 1450 may include a touch panel 1452, a (digital) pen sensor 1454, a key 1456, or an ultrasonic input device 1458. The touch panel 1452 may recognize a touch input in at least one method of capacitive, resistive, infrared, and ultrasonic methods. In addition, the touch panel 1452 may further include a control circuit (not shown). In the embodiment of a capacitive method, the touch panel 1452 may recognize not only physical contact but also hovering. The touch panel 1452 may further include a tactile layer. In this embodiment, the touch panel 1452 may provide a tactile response to the user.

The (digital) pen sensor 1454 may be implemented in the same or similar method as or to the method of receiving a user's touch input or by using a separate detection sheet. The key 1456 may include a physical button, an optical key, or a keypad. The ultrasonic input device 1458 allows the electronic device 1401 to detect sound waves through a microphone (for example, the microphone 1488) through an input device generating ultrasonic signals, and is capable of wireless recognition. According to an exemplary embodiment, the electronic device 1401 may receive a user input from an external device connected thereto (for example, a computer or a server) by using the communication module 1420.

The display 1460 (e.g., the display 150) may include a panel 1462, a hologram device 1464, or a projector 1466. For example, the panel 1462 may be a Liquid Crystal Display (LCD) or an Active Matrix Organic Light Emitting Diode (AM-OLED). For example, the panel 1462 may be implemented to be flexible, transparent, or wearable. The panel 1462 may be configured as a single module along with the touch panel 1452. The hologram device 1464 may show a stereoscopic image in the air using interference of light. The projector 1466 may display an image by projecting light onto a screen. The screen may be located inside or outside the electronic device 1401. According to an exemplary embodiment, the display 1460 may further include a control circuit to control the panel 1462, the hologram device 1464, or the projector 1166.

The interface 1470 may include a High Definition Multimedia Interface (HDMI) 1472, a Universal Serial Bus (USB) 1474, an optical interface 1476, or D-subminiature (sub) 1478. The interface 1470 may be included in the communication interface 160 shown in FIG. 1. Additionally or alternatively, the interface 1470 may include a Mobile High Definition Link (MHL) interface, a Secure Digital (SD)/Multimedia Card (MMC) interface or Infrared Data Association (IrDA) standard interface.

The audio module 1480 may convert a sound and an electric signal bidirectionally. For example, at least some elements of the audio module 1480 may be included in the input and output interface 140 shown in FIG. 1. The audio module 1480 may process sound information which is input or output through a speaker 1482, a receiver 1484, an earphone 1486, or a microphone 1488.

The camera module 1491 is a device for photographing a still image and a moving image, and, according to an exemplary embodiment, the camera module 1491 may include one or more image sensors (for example, a front surface sensor or a rear surface sensor), a lens (not shown), an Image Signal Processor (ISP) (not shown), or a flash (memory) (for example, a Light Emitting Diode (LED) or a xenon lamp).

The power management module 1495 may manage power of the electronic device 1401. Although not shown, the power management module 1495 may include a Power Management IC (PMIC), a charging IC, or a battery or fuel gage.

For example, the PMIC may be mounted in an integrated circuit or a SoC semiconductor. The charging method may be divided into a wire charging method and a wireless charging method. The charging IC may charge a battery and may prevent inflow of overvoltage or over current from a charger. According to an exemplary embodiment, the charging IC may include a charging IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gage may measure a remaining battery life of the battery 1496, a voltage, a current, or temperature during charging. The battery 1496 may store or generate electricity and may supply power to the electronic device 1401 by using stored or generated electricity. The battery 1496 may include a rechargeable battery or a solar battery.

The indicator 1497 may display a specific state of the electronic device 1401 or a part of it (for example, the AP 1410), for example, a booting state, a message state, or a charging state. The motor 1498 may convert an electric signal into a mechanical vibration. Although not shown, the electronic device 1401 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device according to various exemplary embodiments of the present disclosure may be comprised of one or more components, and the names of the elements may vary according to the kind of the electronic device. The electronic device according to various exemplary embodiments of the present disclosure may include at least one of the above-described elements, and some of the elements may be omitted or an additional element may be further included. In addition, some of the elements of the electronic device according to various exemplary embodiments of the present disclosure may be combined into a single entity, and may perform the same functions as those of the elements before being combined.

The term "module" used in various exemplary embodiments of the present disclosure refers to a unit including one of hardware, software, and firmware, or a combination of two or more of them, for example. For example, the "module" may be used interchangeably with terms like unit, logic, logical block, component or circuit. The "module" may be a minimum unit of an integrally configured part or a part of it. The "module" may be a minimum unit that performs one or more functions or a part of it. The "module" may be implemented mechanically or electronically. For example, the "module" according to various exemplary embodiments of the present disclosure may include at least one of an Application Specific Integrated Circuit (ASIC) chip, Field Programmable Gate Arrays (FPGAs), and a programmable logic device which perform any operation that is already well known or will be developed in the future.

According to various exemplary embodiments, at least part of the apparatus (for example, modules or functions) or method (for example, operations) according to various exemplary embodiments of the present disclosure may be implemented by using instructions stored in a computer-readable storage medium in the form of a programming module. When the instructions are executed by one or more processors (for example, the processor 120), the one or more processors may perform a function corresponding to the instructions. The computer-readable storage medium may be the memory 130, for example. At least part of the programming module may be implemented (for example, executed) by using the processor 120. At least part of the programming module may include a module, a program, a routine, sets of instructions, a process, and the like for performing one or more functions.

Examples of the computer-readable recording medium include magnetic media such as hard disks, floppy disks and magnetic tapes, optical media such as Compact Disc Read Only Memories (CD-ROMs) and Digital Versatile Disc (DVDs), magnetooptical media such as floptical disks, and hardware devices such as Read Only Memories (ROMs), Random Access Memories (RAMs) and flash memories that are especially configured to store and execute program commands (for example, the programming module). Examples of the program commands include machine language codes created by a compiler, and high-level language codes that can be executed by a computer by using an interpreter. The above-described hardware devices may be configured to operate as one or more software modules for performing operations of various exemplary embodiment of the present disclosure, and vice versa.

A module or programming module according to various exemplary embodiments of the present disclosure may include one or more of the above-described elements, may omit some elements, or may further include additional elements. The operations performed by the module, the programming module, or the other elements according to various exemplary embodiments of the present disclosure may be performed serially, in parallel, repeatedly, or heuristically. In addition, some operation may be performed in different order or may omitted, and an additional operation may be added.

According to various exemplary embodiments, the instructions stored in the storage medium may be set to allow at least one processor to perform at least one operation when the instructions are executed by the at least one processor, and the at least one operation may include: receiving item order information from a POS terminal; determining a payment method by considering at least one of a discount benefit and a reward point saving benefit based on the received item order information; and requesting a payment approval for the item order information in the determined payment method.

According to various exemplary embodiments, the determining the payment method may include: transmitting at least one of the item order information and a payment method recommendation information request to a server; receiving, from the server, candidate payment method information that provides a relatively greater benefit of at least one of the discount benefit and the reward point saving benefit; and selecting at least one payment method from the candidate payment method information.

According to various exemplary embodiments, the at least one operation may further include: detecting authentication information for payment of the item order information; and transmitting at least one of at least one payment method selected from the candidate payment method information and the authentication information to the server.

According to various exemplary embodiments, the at least one operation may further include: receiving an authentication result in response to the authentication information; when the authentication result is valid, transmitting payment approval request information to the server; and receiving a payment approval result in response to the payment approval request information.

According to various exemplary embodiments, the determining the payment method may include: displaying a payment method list of the user of the electronic device stored in an internal memory of the electronic device; selecting at least one payment method from the payment method list of the user; detecting authentication information for payment of the item order information; and transmitting at least one of the item order information, the selected at least one payment method, and the authentication information to the server.

According to various exemplary embodiments, the at least one operation may further include: when the payment method list of the user of the electronic device stored in the internal memory of the electronic device is displayed, displaying at least one of a discount rate and a reward point corresponding to each of the payment methods based on the item order information.

According to various exemplary embodiments, the at least one operation may further include: receiving an authentication result in response to the authentication information; when the authentication result is valid, transmitting payment approval request information to the server; and receiving a payment approval result in response to the payment approval request information.

According to various exemplary embodiments, the order information may include at least one of an item name, an item price, affiliated store information, an order number, and an order type.

According to various exemplary embodiments, a method for paying of a server may include: receiving at least one of item order information and a payment method recommendation information request from an electronic device; determining candidate payment method information which provides a relatively greater benefit of at least one of a discount benefit and a reward point saving benefit based on the item order information; transmitting the determined candidate payment method information to the electronic device.

According to various exemplary embodiments, the method for paying of the server may further include receiving, from the electronic device, at least one of at least one payment method selected from the candidate payment method information and the authentication information.

According to various exemplary embodiments, the method for paying of the server may further include: transmitting an authentication result to the electronic device in response to the authentication information; when the authentication result is valid, receiving payment approval request information from the electronic device and transmitting the payment approval request information to another server; and receiving a payment approval result from the another serer in response to the payment approval request information and transmitting the payment approval result to the electronic device.

According to various exemplary embodiments, a method for paying of a POS terminal may include: acquiring a purchase item of a user; generating item order information based on the purchase item of the user; transmitting the item order information to an order information transmitting device; and transmitting the item order information to an electronic device of the user via the order information transmitting device.

According to various exemplary embodiments, the order information may include at least one of an item name, an item price, affiliated store information, an order number, and an order type.

As described above, by providing a method, apparatus, and system which is capable of integrating online and offline payment systems, and strengthening security, the payment system is combined with a system which recommends various discount or reward point benefits through user-centered online payment, thereby providing improved user convenience and benefits.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A payment method of an electronic device, the payment method comprising:
   receiving, using a transceiver of the electronic device, item order information including at least one purchase item and an order type from a POS terminal, wherein the order type indicates selection among at least one of a credit card, a discount coupon or a membership card;
   transmitting, using the transceiver of the electronic device, a request to provide a candidate payment method based on the item order information to an external electronic device distinct from the POS terminal;
   receiving, from the external electronic device, information indicating a plurality of candidate payment methods respectively corresponding to at least one credit card, discount coupon or membership card of a user of the electronic device, wherein at least one of the plurality of candidate payment methods comprises paying for the item order information with a combination of a plurality of payment methods;
   displaying, in response to the receiving the plurality of candidate payment methods, the received candidate payment methods, wherein at least one of the plurality of candidate payment methods corresponding to the order type is selected in a display of the electronic device; and
   in response to identification that at least one of the plurality of candidate payment methods are selected, transmitting, to the external electronic device, a request of a payment approval for the item order information according to the selected at least one of the plurality of candidate payment methods.

2. The payment method of claim 1, wherein the receiving of the information comprises:
   receiving, from the external electronic device, the plurality of candidate payment methods provides a relatively greater benefit of at least one of a discount benefit and a reward point saving benefit.

3. The payment method of claim 2, further comprising:
   detecting authentication information for payment of the item order information; and
   transmitting at least one of at least one payment method selected from the candidate payment method information and the authentication information to the external electronic device.

4. The payment method of claim 3, further comprising:
   receiving an authentication result in response to the authentication information;
   when the authentication result is valid, transmitting payment approval request information to the external electronic device; and
   receiving a payment approval result in response to the payment approval request information.

5. The payment method of claim 1, wherein the displaying comprises:
   displaying a candidate payment method list including the plurality of candidate payment methods or at least one candidate payment method stored in an internal memory of the electronic device;
   selecting at least one candidate payment method from the payment method list of the user;
   detecting authentication information for payment of the item order information; and
   transmitting at least one of the item order information, the selected at least one candidate payment method, and the authentication information to the external electronic device.

6. The payment method of claim 5, further comprising:
   when the candidate payment method list of the user of the electronic device stored in the internal memory of the electronic device is displayed, displaying at least one of a discount rate and a reward point corresponding to each of the candidate payment methods included in the candidate payment method list based on the item order information.

7. The payment method of claim 5, further comprising:
   receiving an authentication result in response to the authentication information;
   when the authentication result is valid, transmitting payment approval request information to the external electronic device; and
   receiving a payment approval result in response to the payment approval request information.

8. The payment method of claim 1, wherein the item order information comprises at least one of an item name, an item price, affiliated store information, an order number, or a quantity.

9. The payment method of claim 1, wherein the combination of the plurality of payment methods comprises a payment card and a membership card.

\* \* \* \* \*